United States Patent [19]

Ishikawa et al.

[11] Patent Number: 5,603,226
[45] Date of Patent: Feb. 18, 1997

[54] METHOD AND APPARATUS FOR CONTROLLING VEHICLE AIR CONDITIONER

[75] Inventors: Toshikazu Ishikawa, Hiroshima; Shigetoshi Doi, Iwakuni; Shinshi Kajimoto, Hiroshima-ken; Eiji Ukita, Higashihiroshima; Yoshiaki Nagayama; Hiroshi Asou, both of Hiroshima; Yasuhiro Enno, Higashihiroshima; Takashi Tsuchida, Hiroshima, all of Japan

[73] Assignees: Naldec Corporation; Mazda Motor Corporation, both of Hiroshima, Japan

[21] Appl. No.: 365,400

[22] Filed: Dec. 28, 1994

Related U.S. Application Data

[60] Division of Ser. No. 135,621, Oct. 14, 1993, Pat. No. 5,400,963, which is a continuation-in-part of Ser. No. 911,743, Jul. 10, 1992, abandoned.

[30] Foreign Application Priority Data

| Jul. 10, 1991 | [JP] | Japan | 3-170015 |
| Mar. 31, 1992 | [JP] | Japan | 4-105700 |
| Mar. 31, 1992 | [JP] | Japan | 4-105701 |
| Apr. 2, 1992 | [JP] | Japan | 4-109240 |
| Apr. 8, 1992 | [JP] | Japan | 4-115417 |
| Apr. 8, 1992 | [JP] | Japan | 4-115418 |

[51] Int. Cl.$^6$ ........................ F25D 17/08
[52] U.S. Cl. ........... 62/182; 165/202; 62/186
[58] Field of Search ............ 62/180, 182, 186, 62/176.6; 236/44 C, 49.3, 91 R, 91 E, 91 C, DIG. 9; 165/11.1, 12, 16, 39

[56] References Cited

U.S. PATENT DOCUMENTS

| 4,227,645 | 10/1980 | de La Farge et al. | 165/11.1 X |
| 4,873,649 | 10/1989 | Grald et al. | 62/176.6 X |
| 4,914,924 | 4/1990 | Takahashi . | |
| 4,930,698 | 6/1990 | Takekawa et al. . | |
| 5,148,977 | 9/1992 | Hibiro et al. . | |
| 5,165,595 | 11/1992 | Horio et al. . | |
| 5,167,365 | 12/1992 | Mitoshi et al. . | |
| 5,170,935 | 12/1992 | Federspiel et al. . | |
| 5,172,856 | 12/1992 | Tanaka et al. . | |
| 5,187,943 | 2/1993 | Taniguchi et al. . | |

FOREIGN PATENT DOCUMENTS

| 0363038 | 11/1990 | European Pat. Off. . |
| 57-77216 | 5/1982 | Japan . |
| 60-29319 | 2/1985 | Japan . |
| 61-44015 | 3/1986 | Japan . |
| 62-8327 | 2/1987 | Japan . |
| 2-120117 | 5/1990 | Japan . |

*Primary Examiner*—Harry B. Tanner

[57] ABSTRACT

This invention has as its object to provide a method and apparatus for controlling a vehicle air conditioner, which can obtain a combination of an outlet air flow rate $V_a$ and an outlet air temperature $T_o$, which is desirable for comfort of a passenger, under a condition of air-conditioning control based on a heat balance equation. In order to achieve this object, this invention provides a method of controlling a vehicle air conditioner, including the first step of obtaining, from a heat balance equation, a plurality of combinations of the outlet air flow rates $V_a$ and the outlet air temperatures $T_o$ necessary for maintaining the passenger room temperature to be a predetermined target temperature, the second step of calculating comfort indices each representing the comfort level of a passenger on the basis of state amounts of factors which influence comfort felt by the passenger in the passenger room, and the plurality of combinations of the outlet air flow rates $V_a$ and the outlet air temperatures $T_o$ obtained in the first step, and the third step of searching a combination of the outlet air flow rate and the outlet air temperature, which can provide a comfort index closest to an optimal value of the comfort indices calculated in the second step.

13 Claims, 25 Drawing Sheets

METHOD AND APPARATUS FOR CONTROLLING VEHICLE AIR CONDITIONER

This application is a division of application number 08/135,621, filed Oct. 14, 1993, U.S. Pat. No. 5,400,963, which application Ser. No. 08/135,621 is a continuation-in-part application of U.S. patent application Ser. No. 07/911,743 filed Jul. 10, 1992, now abandoned.

BACKGROUND OF THE INVENTION

The present invention relates to a method and apparatus for controlling a vehicle air conditioner for controlling air-conditioning air.

As described in Japanese Patent Publication No. 62-8327, in a control method for a vehicle air conditioner, the outlet air flow rate and the outlet air temperature of air-conditioning air are controlled while balancing between the heat amount supplied from an air conditioner into a passenger room, and the heat load acting on a vehicle. As will be described in detail later, the fundamental equation of air-conditioning control during an unstable period is given by:

$$Cp \cdot \gamma \cdot V_a(T_o - T_{SET}) = K \cdot S(T_{SET} - T_a) - K_s \cdot T_s - C + K_r \cdot (T_{SET} - T_r)$$

In this control equation, the left-hand side represents the heat amount to be supplied from the air conditioner into the passenger room, and the right-hand side represents the vehicle heat load. In the equation, $T_{SET}$ is the setting temperature, $T_a$ is the atmospheric temperature, and $T_r$ is the passenger room temperature.

In the air-conditioning control, the outlet air flow rate $V_a$ and the outlet air temperature $T_o$ are set on the basis of the above-mentioned heat balance equation. In this case, however, two unknowns $V_a$ and $T_o$ cannot be uniquely obtained from a single equation.

In the technique described in the above-mentioned patent publication (Japanese Patent Publication No. 62-8327), the relationship between an environmental condition such as the atmospheric temperature, and the like, and the outlet air flow rate $V_a$ is determined in advance, and an outlet air flow rate $V_a$ corresponding to the detected environmental condition is preferentially determined. The determined outlet air flow rate $V_a$ is substituted in the heat balance equation to obtain the outlet air temperature $T_o$.

On the other hand, Japanese Patent Laid-Open No. 2-120117 describes the following technique. That is, the outlet air temperature $T_o$ is set by a passenger, and is substituted in the heat balance equation to obtain the outlet air flow rate $V_a$.

In the air-conditioning control, air-conditioning air is controlled, so that the passenger room temperature $T_r$ eventually becomes equal to the setting temperature $T_{SET}$. For example, in terms of comfort, air-conditioning air is controlled to be lower than the setting temperature $T_{SET}$ in the summer, and contrary to this, air-conditioning air is controlled to be higher than the setting temperature $T_{SET}$ in the winter. From this viewpoint, Japanese Patent Laid-Open No. 57-77216 discloses a technique for changing a target temperature in air-conditioning control according to the atmospheric temperature under a condition that the air-conditioning control is made based on the above-mentioned heat balance equation.

The ultimate object of an air conditioner is to provide comfort to passengers, and the comfort felt by a passenger is a combination of various factors. Therefore, when the outlet air flow rate $V_a$ is preferentially determined according to an environmental condition, and then, the outlet air temperature $T_o$ is determined like in the above-mentioned prior art, it is unknown whether or not a combination of the determined outlet air flow rate $V_a$ and outlet air temperature $T_o$ can give the best comfort to a passenger in that specific case.

Similarly, when the outlet air temperature $T_o$ is set by a passenger, it is not always certain whether or not the outlet air temperature $T_o$ set as a desirable temperature by the passenger can give the best comfort in association with the outlet air flow rate $V_a$. Of course, when the set outlet air temperature $T_o$ is not desirable in association with the outlet air flow rate $V_a$, the passenger need only change the outlet air temperature $T_o$. However, this forces an extra operation load on a passenger.

Furthermore, when the target temperature of air-conditioning control is changed according to the atmospheric temperature, it is unknown whether or not the changed target temperature can give the best comfort to a passenger in association with the outlet air flow rate $V_a$.

The above-mentioned problems are always posed during air-conditioning control. Besides these problems, various other problems are posed when an engine is started from a state wherein the engine stands still, and air-conditioning control is initiated.

For example, as a method of solving the problems posed when air-conditioning control is started, as described in Japanese Patent Publication No. 62-5371, the operation of a blower is started when the temperature of an evaporator is decreased to a predetermined temperature, i.e., the outlet operation of air-conditioning air is delayed, so as to prevent hot air in a duct from being exhausted from an outlet port into a passenger room when a cooling operation is started.

For example, assume a vehicle under the blazing sun. A passenger who gets on such a vehicle wants wind at once in any case. However, when air-conditioning air is output upon start of the cooling operation, hot air in a duct is output from the outlet port, as described above, thus enhancing discomfort.

On the other hand, in addition to the problem posed when the cooling operation is started, a problem is also posed when a heating operation is started in the winter.

For example, a water-cooled engine normally uses engine cooling water as a heat source of heating. For this reason, sufficiently warm air cannot be supplied into the passenger room in heating control during a warm-up operation before the engine cooling water is sufficiently warmed.

In association with heating control during the warm-up operation, Japanese Patent Laid-Open No. 60-29319 discloses the following technique. That is, an air outlet mode is changed according to the temperature of engine cooling water. Japanese Patent Publication No. 1-20084 discloses the following technique. That is, when the temperature of engine cooling water is low, a defrosting mode is set, so that cold air-conditioning air does not directly blow against a passenger. On the other hand, when the temperature of engine cooling temperature is increased to a medium temperature, a defrosting/heating mode is set. When the temperature of engine cooling water is increased to a high temperature, a heating mode is set. Japanese Patent Publication No. 60-21082 discloses a technique wherein the outlet air flow rate is increased according to the temperature of engine cooling water.

Comfort felt by a passenger upon blowing of air-conditioning air into the passenger room does not always depend on only the temperature of air-conditioning air. More specifically, if the passenger room temperature is extremely low, even when the defrosting/heating mode is set after the temperature of engine cooling water is considerably increased, cold air in the passenger room is stirred by air-conditioning air output from both a defroster outlet port and a foot outlet port, and for this reason, the passenger may feel rather cold.

SUMMARY OF THE INVENTION

The present invention has been made in consideration of the above situation, and has as its principal object to provide a method and apparatus for controlling a vehicle air conditioner, which can obtain a combination of an outlet air flow rate $V_a$ and an outlet air temperature $T_o$ desirable for passenger's comfort under a condition that air-conditioning control is made on the basis of the heat balance equation.

It is another object of the present invention to provide a method and apparatus for controlling a vehicle air conditioner, which can obtain a combination of an outlet air flow rate $V_a$ and an outlet air temperature $T_o$ desirable for passenger's comfort, and quickly attain a comfortable air-conditioned state during a stable period under a condition that air-conditioning control is made on the basis of the heat balance equation.

It is still another object of the present invention to provide a method and apparatus for controlling a vehicle air conditioner, which adjusts the outlet timing of air-conditioning air so as not to enhance discomfort felt by a passenger when he or she gets in a vehicle assuming a cooling operation.

It is still another object of the present invention to provide a method and apparatus for controlling a vehicle air conditioner, which can desirably switch an outlet mode in consideration of passenger's comfort in heating control during a warm-up operation.

It is still another object of the present invention to provide a method and apparatus for controlling a vehicle air conditioner, which can prevent cold air in a passenger room from being stirred by output air-conditioning air, and a passenger from feeling cold, assuming heating control during a warm-up operation.

In order to solve the above-mentioned problems, and to achieve the above-mentioned objects, a method of controlling a vehicle air conditioner according to the first aspect of the present invention is characterized by the following arrangement.

That is, there is provided a method of controlling a vehicle air conditioner, which controls an outlet air flow rate and an outlet air temperature of air-conditioning air while balancing between a heat amount supplied from an air conditioner for adjusting the air-conditioning air into a passenger room, and a heat load acting on a vehicle, comprising the first step of obtaining, from a heat balance equation, a plurality of combinations of the outlet air flow rates and the outlet air temperatures necessary for maintaining a passenger room temperature to be a predetermined target temperature, the second step of calculating comfort indices each representing a comfort level of a passenger on the basis of state amounts of factors which influence comfort felt by the passenger in the passenger room, and the plurality of combinations of the outlet air flow rates and the outlet air temperatures obtained in the first step, and the third step of searching a combination of the outlet air flow rate and the outlet air temperature, which can provide a comfort index closest to an optimal value of the comfort indices calculated in the second step.

A method of controlling a vehicle air conditioner according to the second aspect of the present invention is characterized by the following arrangement.

That is, there is provided a method of controlling a vehicle air conditioner, which controls an outlet air flow rate and an outlet air temperature of air-conditioning air while balancing between a heat amount supplied from an air conditioner for adjusting the air-conditioning air into a passenger room, and a heat load acting on a vehicle, comprising the first step of predicting an optimal target temperature with reference to a comfort index having, as parameters, factors which influence comfort felt by a passenger in the passenger room, and on the basis of a comfort index obtained under an assumption that a control state of air-conditioning control is in a stable period, and a heat balance equation, the second step of selecting an outlet air flow rate and an outlet air temperature on the basis of the target temperature predicted in the first step and a comfort index having, as parameters, factors which influence comfort actually felt by the passenger in the passenger room, and the third step of executing the air-conditioning control on the basis of the outlet air flow rate and the outlet air temperature selected in the second step.

An apparatus for controlling a vehicle air conditioner according to the first aspect of the present invention is characterized by the following arrangement.

That is, there is provided an apparatus for controlling a vehicle air conditioner, which controls an outlet air flow rate and an outlet air temperature of air-conditioning air while balancing between a heat amount supplied from an air conditioner for adjusting the air-conditioning air into a passenger room, and a heat load acting on a vehicle, comprising first calculation means for obtaining, from a heat balance equation, a plurality of combinations of the outlet air flow rates and the outlet air temperatures necessary for maintaining a passenger room temperature to be a predetermined target temperature, second calculation means for calculating comfort indices each representing a comfort level of a passenger on the basis of state amounts of factors which influence comfort felt by the passenger in the passenger room, and the plurality of combinations of the outlet air flow rates and the outlet air temperatures obtained by the first calculation means, and search means for searching a combination of the outlet air flow rate and the outlet air temperature, which can provide a comfort index closest to an optimal value of the comfort indices calculated by the second calculation means.

The apparatus for controlling a vehicle air conditioner according to the first aspect of the present invention is also characterized by the following arrangement.

That is, there is provided a vehicle air conditioner comprising comfort index calculation means for calculating a comfort index including, as parameters, factors which influence comfort of a passenger in heating control during a warm-up operation, detection means for detecting information necessary for calculating the comfort index, and outlet mode control means for changing an outlet mode in the heating control during the warm-up operation in accordance with a value of the comfort index calculated by the comfort index calculation means.

A vehicle air conditioner according to the second aspect of the present invention is characterized by the following arrangement.

That is, there is provided a vehicle air conditioner for suppressing an outlet air flow rate in heating control during a warm-up operation, comprising room temperature detection means for detecting a passenger room temperature at the beginning of the heating control during the warm-up operation, and air flow rate control means for receiving a signal from the room temperature detection means, and for, when the passenger room temperature at the beginning of the heating control is low, decreasing a rate of increase in outlet air flow rate as compared to a case wherein the passenger room temperature is high.

A vehicle air conditioner according to the third aspect of the present invention is characterized by the following arrangement.

That is, there is provided a vehicle air conditioner for suppressing an outlet air flow rate in heating control during a warm-up operation, comprising calculation means for calculating a comfort index including, as a parameter, a passenger room temperature at the beginning of the heating control during the warm-up operation, and air flow rate control means for, when the passenger room temperature is low and the comfort index has a small value, decreasing a rate of increase in outlet air flow rate as compared to a case wherein the passenger room temperature is high and the comfort index has a large value, in accordance with the comfort index.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS

The preferred embodiments of the present invention will now be described with reference to the accompanying drawings.

(First Embodiment)

Figure 1:
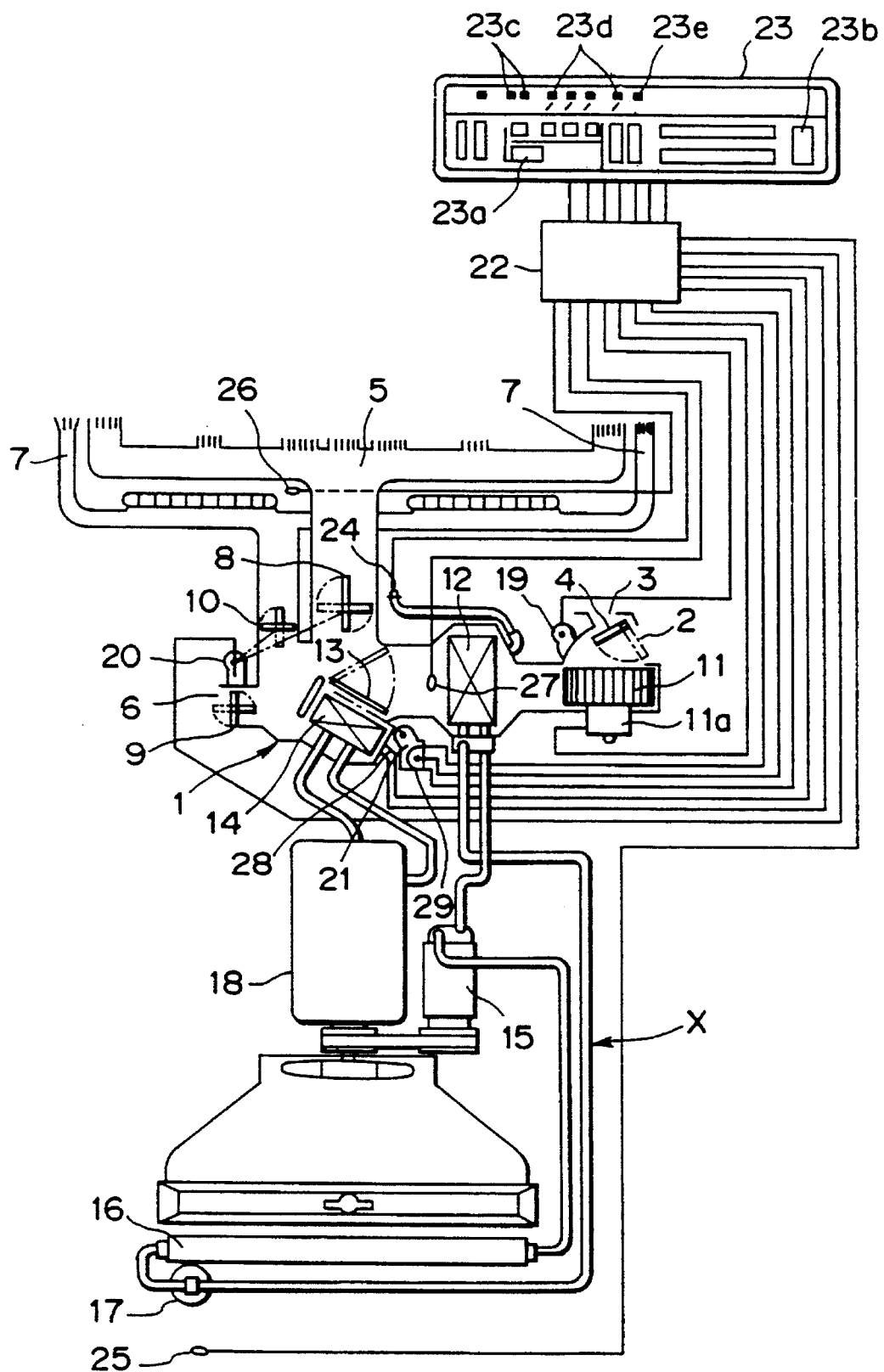
FIG. 1 is a view showing the overall structure of an air conditioner.

In FIG. 1, reference numeral 1 denotes a ventilation duct for supplying air-conditioning air to a passenger room. The ventilation duct 1 is provided with an outer air inlet 2 for introducing outer air, and an inner air inlet 3 for circulating air in the passenger room at its upstream end side. These outer and inner air inlets 2 and 3 are selectively opened/closed by an inner/outer air switching damper 4.

On the other hand, at the downstream end side of the ventilation duct 1, a ventilation outlet port 5 open toward a passenger's bust, a foot outlet port (heating outlet port) 6 open toward passenger's feet, and defroster outlets 7 open toward a front glass or door glass are provided. These outlets 5 to 7 are opened/closed by corresponding mode switching dampers 8 to 10.

In the ventilation duct 1, a blower 11, a cooling heat exchanger 12, an air mixing damper 13, and a heating heat exchanger 14 are arranged in the order named from the upstream side toward the downstream side. By controlling an opening degree θ of the air mixing damper 13, the ratio of the air flow rate passing through the heating heat exchanger 14 and the air flow rate bypassing the heating heat exchanger 14 (air mixing ratio) is adjusted, thereby adjusting the temperature (outlet air temperature $T_o$) of air-conditioning air.

More specifically, assume that the opening degree θ of the air mixing damper 13 when the air flow rate ratio to the heating heat exchanger 14 is "100%" is expressed as "θ=1", and the opening degree θ when the air flow rate ratio is "0%" is expressed as "θ=0". In this case, the outlet air temperature $T_o$ is adjusted stepless between the highest temperature obtained when "θ=1" and the lowest temperature obtained when "θ=0".

The opening degree θ of the air mixing damper 13 is calculated based on the following equation:

$$\theta=(T_o-T_e)/(K_w \cdot T_w-T_e)$$

where $T_e$:

exit temperature of cooling heat exchanger 12

$T_w$: temperature of engine cooling water $T_o$: outlet air temperature $K_w$: coefficient for converting temperature of engine cooling water into exit temperature of heating heat exchanger 14

The cooling heat exchanger 12 comprises an evaporator inserted in a coolant circuit X including a compressor 15, a condenser 16, and a receiver 17, and the operation of the evaporator 12 is controlled by turning "on" or "off" an electromagnetic clutch 31 (FIG. 2) inserted between the compressor 15 and an engine 18.

The heating heat exchanger 14 comprises a heater core through which the cooling water of the engine 18 passes. The amount of the engine cooling water passing through the heater core 14 is adjusted by an opening/closing valve (not shown) interlocked with the air mixing damper 13.

In FIG. 1, reference numeral 19 denotes a motor serving as an actuator for the inner/outer air switching damper 4. Reference numeral 20 denotes a motor serving as an actuator for the mode switching dampers 8 to 10. Reference numeral 21 denotes a servo motor serving as an actuator for the air mixing damper 13. These motors 19 to 21, and the like are controlled based on a signal output from a control circuit 22.

The control circuit 22 is constituted by, e.g., a microcomputer, and comprises, e.g., a CPU 30 (FIG. 2), a ROM, a RAM, and the like, as is well known. The control circuit 22 receives signals from various manual switches 23a to 23e arranged on a console panel 23 and from sensors 24 to 29.

The switch 23a is an auto switch for turning on/off an automatic air-conditioning control mode. The switch 23b is used for setting a passenger room temperature (i.e., a set switch of the setting temperature $T_{SET}$). The switch 23c is used for switching between an inner air circulation mode and an outer air introduction mode. The switch 23d is an outlet mode switch for switching the outlet ports. The switch 23e is a defroster switch for selecting an open/closed state of the defroster outlet ports 7. The sensor 24 is a room temperature sensor for detecting the passenger room temperature $T_r$, and is arranged inside the ventilation duct 1 in this embodiment. The sensor 25 is an atmospheric temperature sensor for detecting the atmospheric temperature $T_a$. The sensor 26 is a solar radiation sensor for detecting a solar radiation amount $T_s$. The sensor 27 is a duct sensor for detecting the exit temperature $T_e$ of the cooling heat exchanger 12. The sensor 28 is a water temperature sensor for detecting the temperature $T_w$ of the engine cooling water. The sensor 29 comprises a potentiometer for detecting the opening degree θ of the air mixing damper 13.

Note that the blown air flow rate (in other words, the outlet air flow rate) $V_a$ of the blower 11 is controlled by changing an application voltage to a blower motor 11a as the driving source of the blower 11. On the other hand, the opening degree θ of the air mixing damper 13 is feedback-controlled on the basis of the opening degree θ detected by the potentiometer 29.

Figure 2:
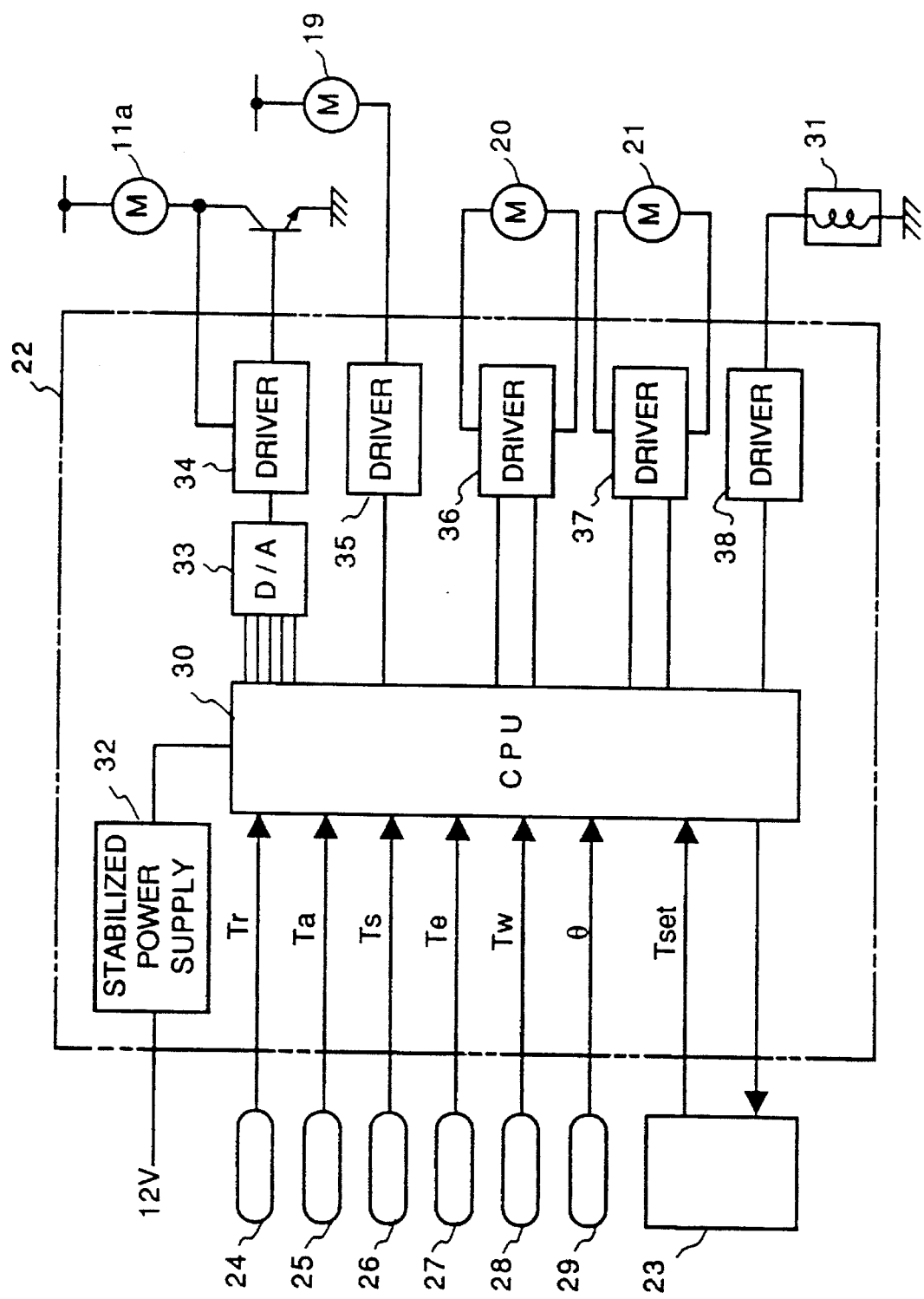
FIG. 2 is a block diagram showing the overall arrangement of the air conditioner.

The air-conditioning control system will be described in detail below. As shown in FIG. 2, the control circuit 22 receives signals from the above-mentioned sensors 24 to 29 and switch signals from the console panel 23. On the other hand, the motors 19, 20, and 21, the blower motor 11a, and the electromagnetic clutch 31 inserted between the compressor 15 and the engine 18 are controlled on the basis of an output signal from the control circuit 22. In FIG. 2, reference numeral 32 denotes a stabilized power supply; 33, a D/A converter; and 34 to 38, drivers.

The outline of air-conditioning control performed by the control circuit 22 will be described below.

Conventional air-conditioning control based on the heat balance equation will be explained first. The air-conditioning control is attained by balancing between the heat load acting on a vehicle and the heat amount supplied from the air conditioner into the passenger room. This control will be described in detail below.

The heat load acting on the vehicle will be referred to as a vehicle heat load, and is represented by "$Q_L$". The vehicle heat load $Q_L$ includes the following parameters.

1) Heat Transfer Load $Q_u$

The heat transfer load $Q_u$ is a heat load based on the difference between the passenger room temperature and the atmospheric temperature, and is given by:

$$Q_u = K \cdot S(T_r - T_a)$$

where $T_r$: passenger room temperature $T_a$: atmospheric temperature

S: heat transfer area

K: coefficient

2) Solar Radiation Load $Q_s$

The solar radiation load $Q_s$ is a heat load based on solar radiation received by the entire vehicle body, and is given by:

$$Q_s = K_s \cdot T_s$$

where $T_s$: solar radiation amount (kcal/h·m$^2$) detected by solar radiation sensor $K_s$: conversion coefficient (m$^2$)

3) Heat Load $Q_m$ from Passenger

The heat load $Q_m$ is a heat amount generated by a passenger.

4) Heat Load $Q_e$ Conducted from Engine Room to Passenger Room

The heat load $Q_e$ is a heat amount of heat generated by, e.g., the engine conducted to the passenger room.

5) Vehicle Body Heat Capacity $Q_n$

The vehicle body heat capacity $Q_n$ is a heat amount of interior equipment such as seats, an instrument panel, and the like, and is given by:

$$Q_n = (m \cdot c/h) \cdot (T_{SET} - T_r)$$

where m: mass of interior equipment c: specific heat of interior equipment h: time required until temperature of interior equipment reaches setting temperature $T_{SET}$ Note that the vehicle body heat capacity $Q_n$ becomes "$Q_n=0$" when the passenger room temperature $T_r$ becomes equal to the setting temperature $T_{SET}$. More specifically, in a stable period wherein the air-conditioned state is stabilized, the vehicle body heat capability $Q_n$ becomes zero.

In consideration of the above-mentioned parameters, the vehicle heat load $Q_L$ during an unstable period can be expressed by the following equation:

$$\begin{aligned} Q_L &= Q_u - Q_s - Q_m - Q_e + Q_n \\ &= K \cdot S(T_r - T_a) - K_s \cdot T_s - C + K_i \cdot (T_{SET} - T_r) \end{aligned}$$

where

C: constant obtained when $Q_m$ and $Q_e$ are considered to be constant $K_i$: constant equal to m·c/h On the other hand, the vehicle heat load $Q_L$ in a stable period can be expressed by the following equation:

$$\begin{aligned} Q_L &= Q_u - Q_s - Q_m - Q_e \\ &= K \cdot S(T_r - T_a) - K_s \cdot T_s - C \end{aligned}$$

On the other hand, the heat amount supplied from the air conditioner into the passenger room will be referred to as heat exchange capability, and is represented by "$Q_a$". The heat exchange capability $Q_a$ is given by:

$$Q_a = Cp \cdot \gamma V_a (T_o - T_r)$$

where

Cp: specific heat at constant pressure of air $\gamma$: specific gravity of air $V_a$: outlet air flow rate of air-conditioning air (blown air flow rate of blower)

$T_o$: outlet air temperature of air-conditioning air $T_r$: passenger room temperature Note that the above $Q_a$ equation is employed in the inner air circulation mode, and in the outer air introduction mode, the following equation is employed.

$$Q_a = Cp \cdot \gamma \cdot V_a (T_o - T_a)$$

where Ta is the atmospheric temperature, as described above.

When the heat exchange capability $Q_a$ and the vehicle heat load $Q_L$ are balanced ($Q_a = Q_L$), air-conditioning control can be properly made to attain the setting temperature $T_{SET}$. More specifically, the fundamental equation of air-conditioning control is expressed by the following balance equation during an unstable period:

$$Cp \cdot \gamma V_a (T_o - T_{SET}) = K \cdot S(T_{SET} - T_a) - K_s \cdot T_s - C + K_i \cdot (T_{SET} - T_r)$$

On the other hand, during a stable period, the fundamental equation of air-conditioning control is expressed by the following balance equation:

$$Cp \cdot \gamma V_a (T_o - T_{SET}) = K \cdot S(T_{SET} - T_a) - K_s \cdot T_s - C$$

The air-conditioning control according to the present invention will be described below.

In the embodiment according to the present invention, control is made using the stable period control equation:

$$Cp \cdot \gamma V_a (T_o - T_{SET}) = K \cdot S(T_{SET} - T_a) - K_s \cdot T_s - C$$

even during an unstable period. The optimal combination of the outlet air flow rate $V_a$ and the outlet air temperature $T_o$ as variables in this control equation is selected on the basis of a comfort index F defined by the following equation:

$$F = K_1 \cdot V_a + K_2 \cdot T_o + K_3 \cdot T_a + K_4 \cdot T_r + K_5 T_s$$

where $V_a$, and the like have the same meanings as those in equation (1), and are as follows:

$V_a$: outlet air flow rate of air-conditioning air $T_o$: outlet air temperature of air-conditioning air $T_a$: atmospheric temperature $T_r$: passenger room temperature $T_s$: solar radiation amount Also, $K_1$ to $K_5$ are weighting coefficients, and these coefficients $K_1$ to $K_5$ are experimentally obtained.

That is, the comfort index F is obtained by converting a comfort level felt by a passenger into an index on the basis of various parameters which influence the passenger's comfort level. In this case, the coefficients $K_1$ to $K_5$ are set so that the most comfortable state is represented by F=5. Therefore, as the index F deviates more from F=5, the discomfort level is increased. For example, when the comfort index F is larger than "F=5" (e.g., F=7), this means, as an example of discomfort, a state wherein a passenger feels hot. When the comfort index is smaller than "F=5" (e.g., F=3), this means, as an example of discomfort, a state wherein a passenger feels cold.

In this manner, when the comfort index F is "F=5" calculated based on the outlet air temperature $T_o$ and the outlet air flow rate $V_a$ obtained by the above-mentioned balance equation, it is determined that this combination of the outlet air temperature $T_o$ and the outlet air flow rate $V_a$ can form the most comfortable air-conditioned state in a future stable period, and the control is made to attain the outlet air temperature $T_o$ and the outlet air flow rate $V_a$.

On the other hand, when the comfort index F obtained based on the selected outlet air temperature $T_o$ and outlet air flow rate $V_a$ has a value deviated from "F=5", a more preferred combination of the outlet air temperature $T_o$ and the outlet air flow rate $V_a$ is searched.

This search operation is realized by changing a target temperature $T_{TRG}$ in air-conditioning control. More specifically, the search operation in the above-mentioned first stage is performed using the setting temperature $T_{SET}$ as the target temperature $T_{TRG}$ ($T_{TRG}=T_{SET}$). As a result of the search operation in the first stage, when it is determined based on the comfort index F that a combination of the outlet air temperature $T_o$ and the outlet air flow rate $V_a$ does not provide comfort (when the value F largely deviated from F=5 can only be obtained), the target temperature $T_{TRG}$ is increased or decreased by a predetermined amount ($\Delta T_{TRG}$), and another combination of the outlet air temperature $T_o$ and the outlet air flow rate $V_a$, which can provide comfort, is searched using the value F. The target temperature $T_{TRG}$ is repetitively changed until "F≅5" is obtained as the value of the comfort index F.

In this embodiment, the outlet ports, i.e., an outlet mode is selected on the basis of the comfort index F. More specifically, an optimal combination of the outlet air temperature $T_o$ and the outlet air flow rate $V_a$ is selected in association with the outlet mode.

The contents of the air-conditioning control premised on the above description will be described in detail below with reference to the flow charts shown in FIGS. 3 to 13.

Figure 3:
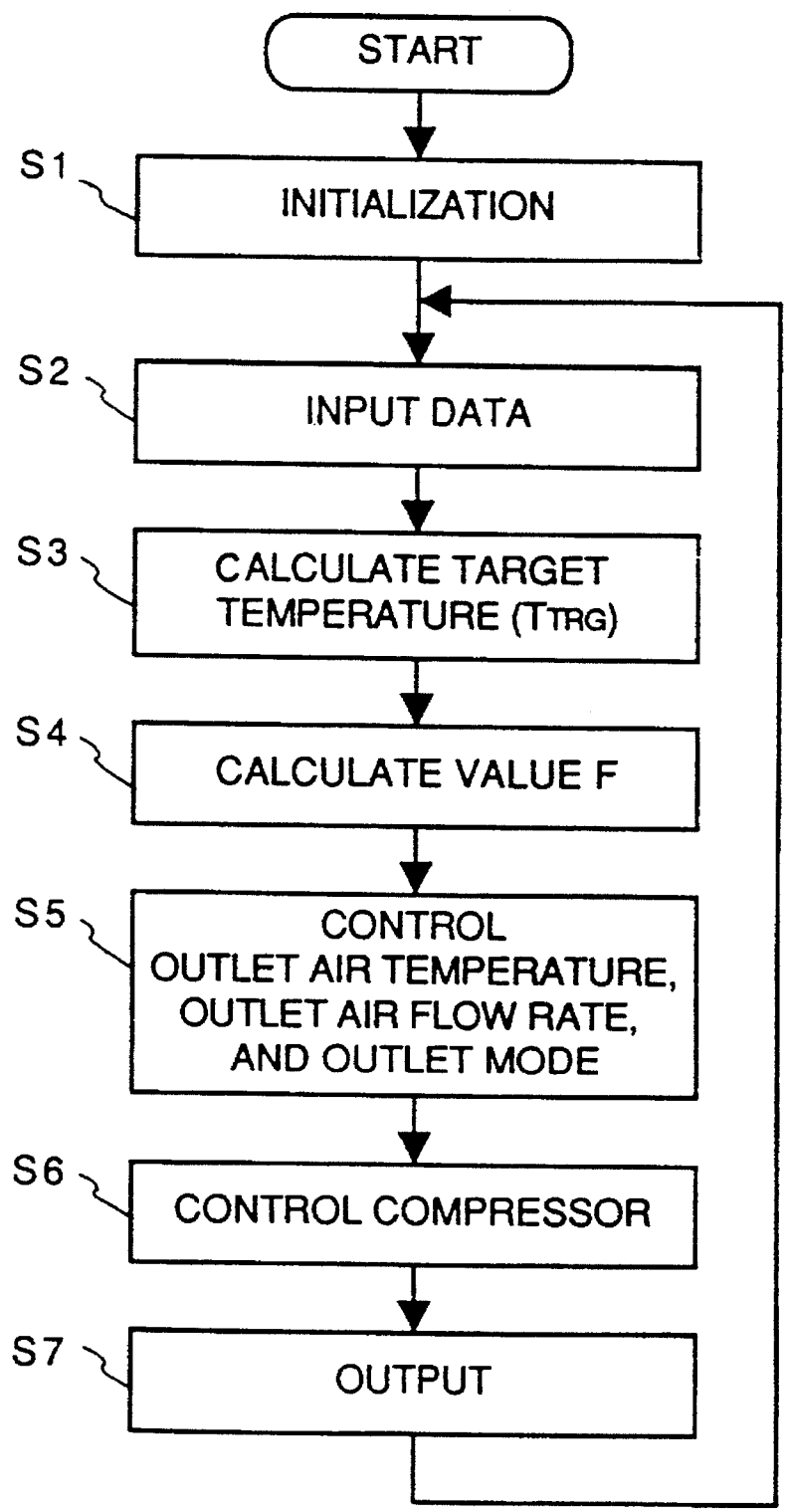
FIG. 3 is a schematic flow chart of the overall control content of air-conditioning control.

FIG. 3 shows the outline of the overall flow of air-conditioning control. More specifically, in step S1, initialization is performed. Thereafter, in step S2, data from the various sensors are input. In step S3, a target temperature $T_{TRG}$ is calculated. In step S4, a comfort index F is calculated on the basis of the outlet air temperature $T_o$ and the outlet air flow rate $V_a$ obtained based on the target temperature $T_{TRG}$. In step S5, the outlet air temperature $T_o$ and the outlet air flow rate $V_a$, which are determined based on the value of the comfort index F (value F) to attain a comfortable state, are set (a combination of the outlet air temperature $T_o$ and the outlet air flow rate $V_a$, which yields the value F closest to F=5). In addition, an outlet mode (outlet ports) is set on the basis of the comfort index F. Thereafter, in step S6, the ON/OFF state of the compressor is controlled. In step S7, air-conditioning control is executed.

The control contents according to this embodiment will be described in detail below with reference to the flow charts shown in FIG. 4 and subsequent drawings.

Ventilation Mode

Figure 4:
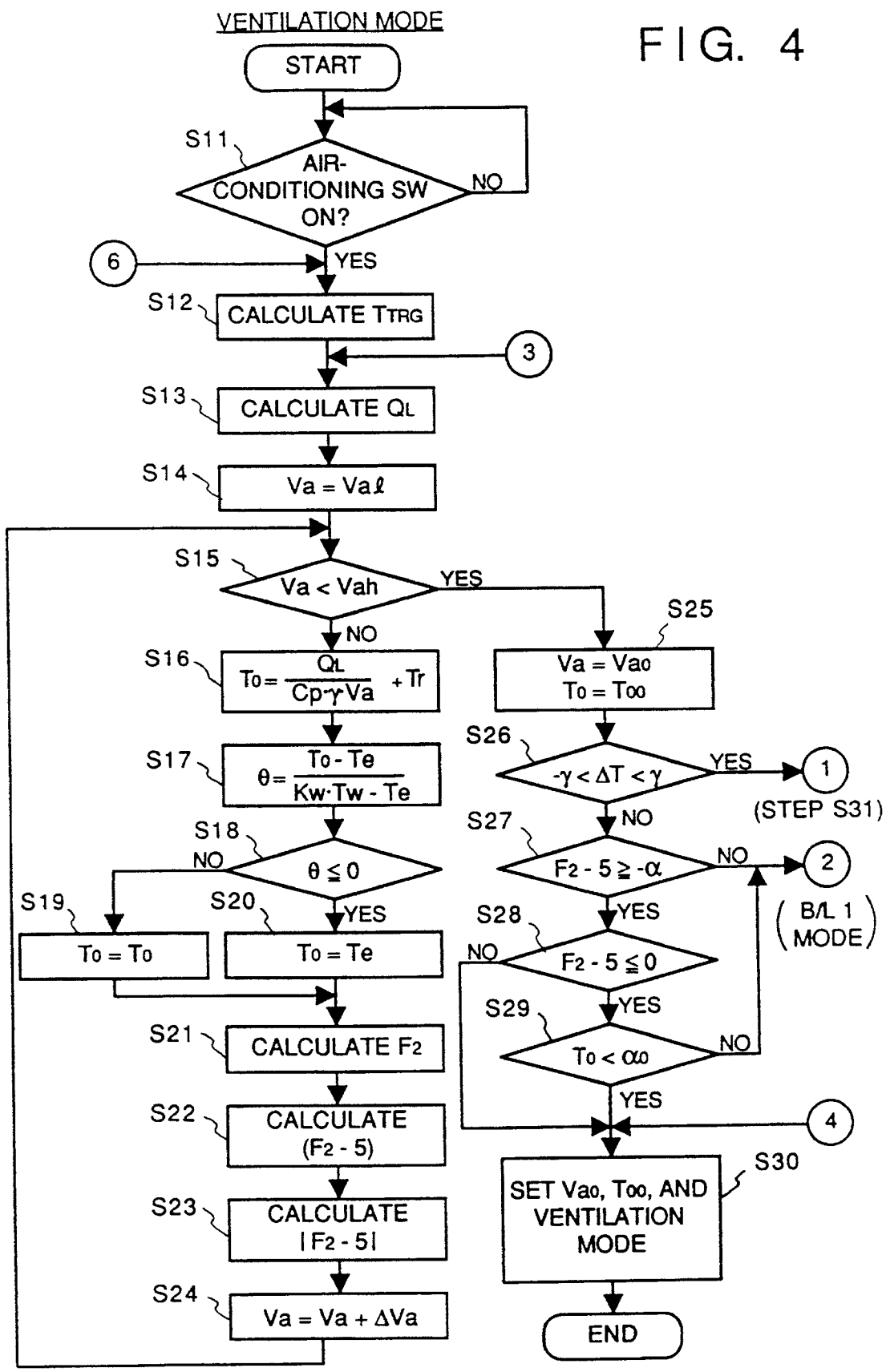
FIG. 4 is a flow chart showing an example of ventilation mode control.
Figure 5:
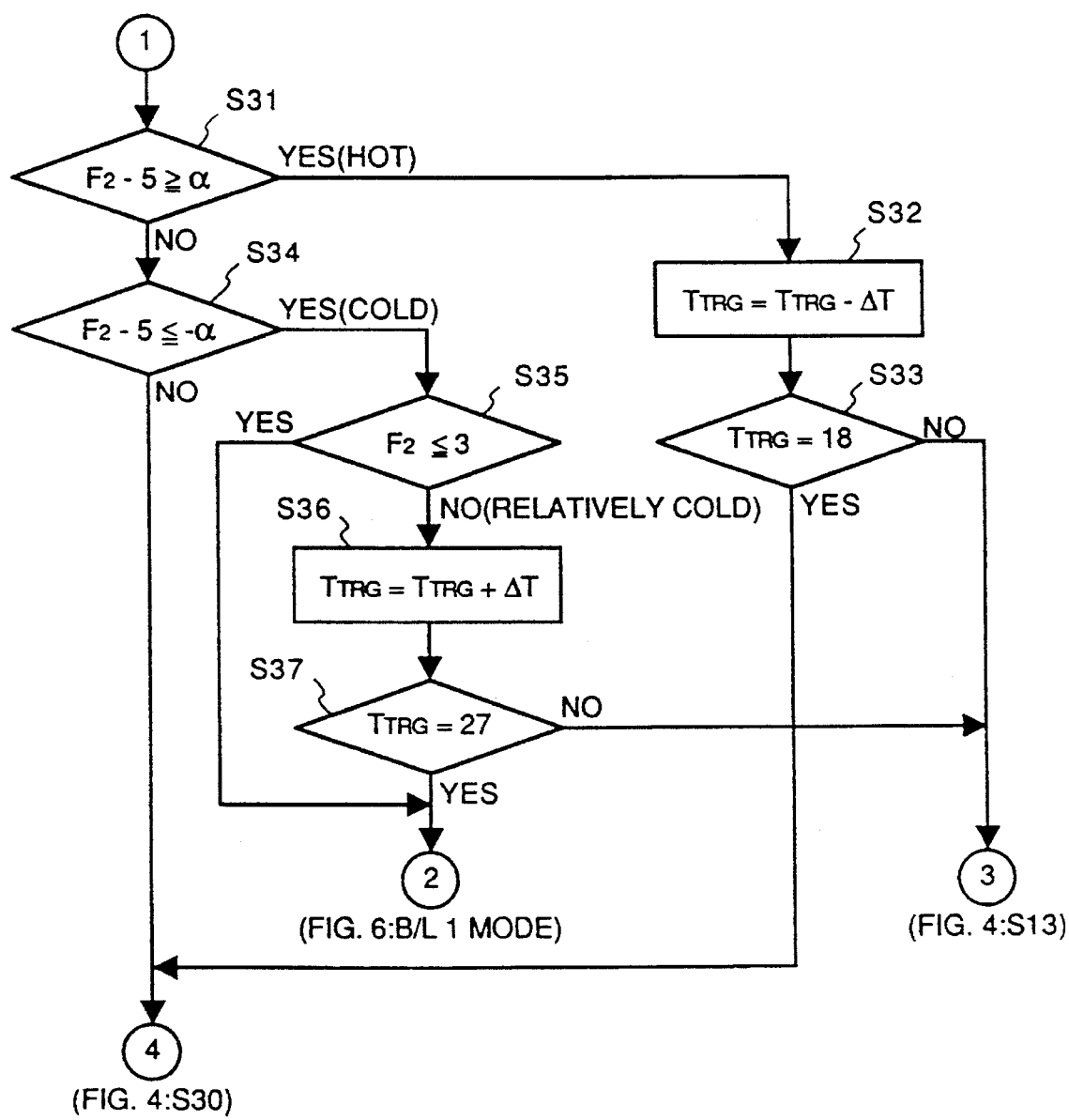
FIG. 5 is a flow chart showing details of target temperature change control in the ventilation mode control.

FIGS. 4 and 5 show a routine for setting the ventilation outlet port 5 (ventilation mode). After it is confirmed in step S11 in FIG. 4 that an air-conditioning switch is turned on, the flow advances to step S12 to calculate a target temperature $T_{TRG}$, as will be described in detail later. In step S13, a vehicle heat load $Q_L$ is calculated. The vehicle heat load $Q_L$ is calculated by $Q_L = K \cdot S(T_r - T_a) - K_s \cdot T_s - C + K_i \cdot (T_{SET} - T_r)$ using the equation in the unstable period.

The processing in steps S14 to S24 is executed to obtain a combination of the outlet air temperature $T_o$ and the outlet air flow rate $V_a$. The outline of this processing will be described below.

Figure 14:
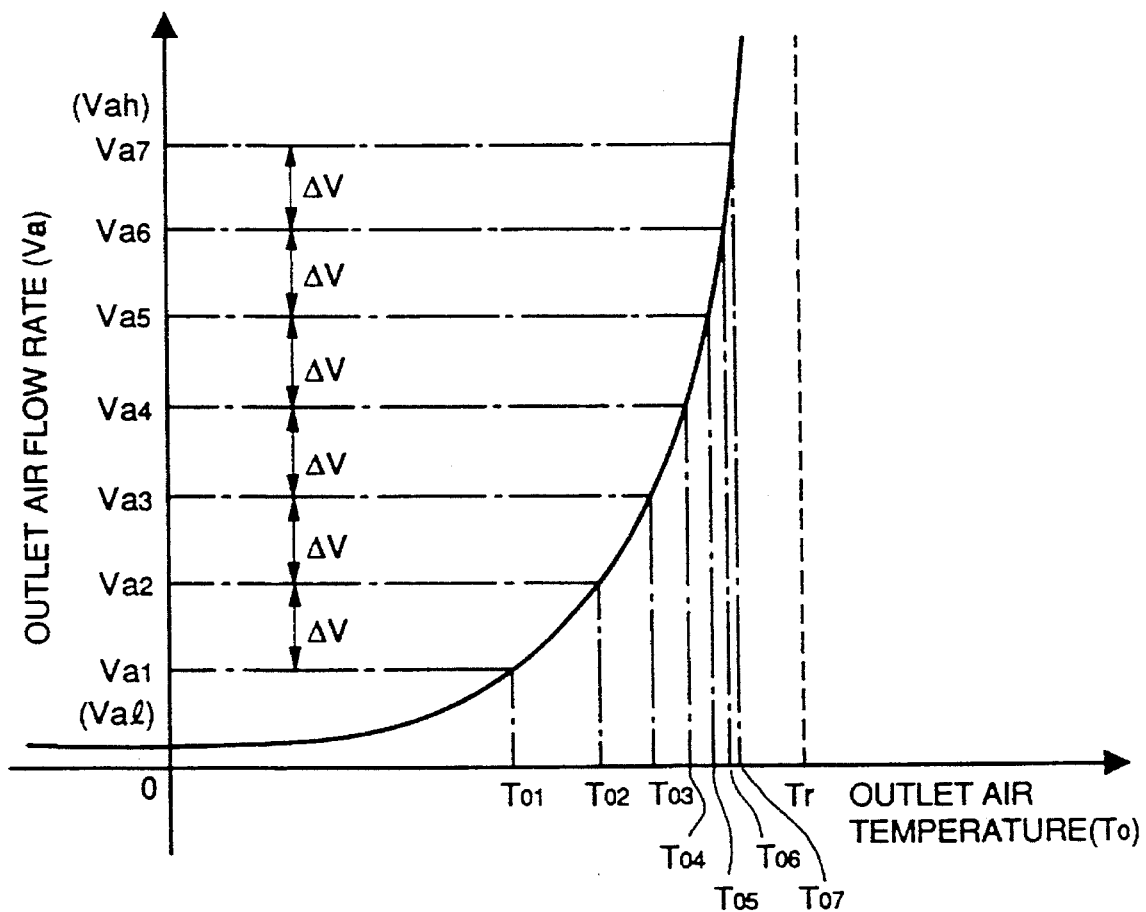
FIG. 14 is a graph showing the relationship between the outlet air flow rate and the outlet air temperature which can be set on the basis of the heat balance equation, and also showing the relationship between the outlet air flow rate and the outlet air temperature which can be selected on the basis of a comfort index F.

The combination of the outlet air temperature $T_o$ and the outlet air flow rate $V_a$ is obtained as follows under a condition that the vehicle heat load $Q_L$ is constant. More specifically, when the vehicle heat load $Q_L$ is assumed to be constant, the relationship between the outlet air temperature and the outlet air flow rate can be expressed by an inverse proportionality curve having $T_o = T_{SET}$ and $V_a = 0$ as asymptotic lines, as shown in FIG. 14. Based on this relationship, in this embodiment, assuming that a low air flow rate $V_a1$ ($V_{a1}$) is set as the outlet air flow rate $V_a$, a corresponding outlet air temperature $T_{o1}$ is calculated, and a comfort index F based on the low air flow rate $V_{a1}$ and the outlet air temperature $T_{o1}$ is then calculated.

AS the comfort index F, a comfort index $F_2$ for a cooling operation is used. The comfort index $F_2$ is obtained by converting (by setting the weighting coefficients $K_1$ to $K_5$), into an index, a comfort level felt by a passenger upon output of air-conditioning air from the ventilation outlet port 5 when a cooling operation is performed (by selecting the ventilation outlet port 5; by setting the ventilation mode). Therefore, the comfort index $F_2$ mainly represents the comfort level left at the bust of a passenger.

Subsequently, assuming that an air flow rate $Va2$ obtained by adding a predetermined value $\Delta V$ to the low air flow rate $V_{a1}$ is set, a corresponding outlet air temperature $T_{o2}$ is obtained (see FIG. 14). In addition, a comfort index $F_2$ based on $V_{a2}$ and $T_{o2}$, and the absolute value of a value obtained by subtracting 5 from the value $F_2$ are calculated. Thereafter, up to a maximum air flow rate $V_{ah}$ ($V_{a7}$), an outlet air temperature $T_{o(n)}$, a comfort index $F_2$, and the absolute value of a deviation between the value $F_2$ and 5 are calculated on the basis of an air flow rate $V_{a(n)}$ obtained by adding the predetermined value $\Delta V$ to an air flow rate $V_{a(n-1)}$. These air flow rates $V_{a(n)}$, $T_{o(n)}$, the values $F_2$, and the absolute values of the deviations are stored in the RAM.

Referring back to the flow chart shown in FIG. 4, in step S14, the outlet air flow rate $V_a$ is set to be a low air flow rate $V_a1$ ($V_{a1}$). Thereafter, in step S16, an outlet air temperature $T_{o1}$ corresponding to the low air flow rate $V_{a1}$ is calculated. In step S17, the opening degree $\theta$ of the air mixing damper 13 is calculated on the basis of the outlet air temperature $T_{o1}$. In step S18, it is checked if the opening degree $\theta$ obtained in step S17 is equal to or smaller than zero. If YES in step S18, it is determined that the air flow rate ratio to the heating heat exchanger 14 becomes 0%, and the flow advances to step S20. In step S20, the exit temperature $T_e$ of the cooling heat exchanger 14 is set to be the outlet air temperature $T_o$. On the other hand, if NO ($\theta > 0$) in step S18, it is determined that the air mixing operation is performed, and the outlet air temperature $T_{o1}$ is set to be the outlet air temperature $T_o$ in step S19. In step S21, a comfort index $F_2$ is calculated, and in step S22, a deviation ($F_2-5$) between the value $F_2$ and 5 is calculated. In step S23, the absolute value of the deviation is calculated. Thereafter, in step S24, $\Delta V$ is added to the outlet air flow rate $V_{a1}$, and the processing in steps S15 to S24 is repeated until the maximum air flow rate $V_{ah}$ ($V_{a7}$) is reached. With this series of processing operations, the outlet air temperatures and the values F corresponding to the outlet air flow rates are obtained like ($V_{a1}$, $T_{o1}$, and the absolute value of the deviation), ($V_{a2}$, $T_{o2}$, and the absolute value of the deviation), ....

Upon completion of the processing for obtaining the combinations, the flow advances from step S15 to step S25, and a combination of the outlet air flow rate $V_a$ and the outlet air temperature $T_o$, which has the minimum absolute value of the deviation between the value $F_2$ and 5, is selected. More specifically, a combination of the outlet air flow rate and the outlet air temperature, which exhibits a value F closest to $F_2=5$ (a state wherein a passenger feels most comfortable), is selected. The selected outlet air flow rate $V_a$ is represented by "$V_{ao}$", and the outlet air temperature $T_o$ paired with the outlet air flow rate $V_{ao}$ is represented by "$T_{oo}$" (selection of $V_{ao}$ and $T_{oo}$).

In step S26, it is checked if an air-conditioned state has reached a stable state. More specifically, it is checked if $\Delta T$ ($=T_r-T_{TRG}$) falls within a predetermined range. If NO in step S26, it is determined that the passenger room temperature. $T_r$ deviates from the target temperature $T_{TRG}$ (e.g., the deviation is 2° C. or more), and an unstable period is determined. The flow then advances to step S27 to check if the value ($F_2-5$) is equal to or larger than a predetermined value ($-\alpha$; e.g., $\alpha=1$). If YES in step S27 ($F_2$ based on $V_{ao}$ and $T_{oo}$ is 4 or more), the flow advances to step S28 to check if the value $F_2$ is equal to or smaller than 5. If NO in step S28 ($F_2 > 5$), it is determined that a state wherein a passenger feels that-his or her bust is hot is set, and the flow then advances to step S30. In step S30, the ventilation outlet port 5 is set, and the combination ($V_{ao}$ and $T_{oo}$) of the outlet air flow rate and the outlet air temperature is set. Thus, air-conditioning air is blown from the ventilation outlet port 5 toward the bust of the passenger (ventilation mode). In this air-conditioned state, the air flow rate is set to be $V_{ao}$, and the temperature is set to be $T_{oo}$.

If YES in step S28, it is determined that the comfort index $F_2$ based on $V_{ao}$ and $T_{oo}$ is 5 or less, i.e., that a state a passenger feels that his or her bust is comfortable or cold is set. The flow advances to step S29 to check if the selected outlet air temperature $T_o$ is smaller than a predetermined value $\alpha_o$ (e.g., 30° C.). If YES in step S29, the flow advances to step S30. On the other hand, if NO in step S27, i.e., if $F_2$ is smaller than 4, it is determined that a state wherein a passenger feels that his or her bust is cold is set, and the control enters a B/L1 mode (to be described later). If NO in step S29, i.e., if the selected outlet air temperature $T_o$ is 30° C. or more, it is determined that a passenger feels discomfort since hot air blows against his or her face, and the control enters the B/L1 mode (to be described later).

If YES in step S26, i.e., if the difference between the passenger room temperature $T_r$ and the target temperature $T_{TRG}$ is small, it is determined that an air-conditioned state has nearly reached a stable period, and the flow advances to step S31 and subsequent steps (FIG. 5).

The processing in step S31 and subsequent steps is performed to correct the target temperature $T_{TRG}$ in a stable period. It is checked in step S31 if the value ($F_2-5$) is equal to or larger than the predetermined value (e.g., $\alpha=1$). If YES in step S31 ($F_2 \geq 6$), it is determined that a state wherein a passenger feels hot is set, and the flow advances to step S32. In step S32, the target temperature $T_{TRG}$ is changed, i.e., is decreased by the predetermined value $\Delta T$. In step S33, it is checked if the target temperature $T_{TRG}$ is 18° C. If NO in step S33, the flow returns to step S13, and an optimal outlet air temperature, and the like are calculated again on the basis of the changed target temperature $T_{TRG}$.

When the value of the comfort index $F_2$ obtained by the optimal outlet air temperature $T_{oo}$ and the optimal outlet air flow rate $V_{ao}$ calculated based on the changed target temperature $T_{TRG}$ becomes "value F≡5", it is determined that an optimal air-conditioned state has been found by changing the target temperature $T_{TRG}$, and the flow advances to step S30. On the other hand, if YES is determined again in step S31 based on the changed target temperature $T_{TRG}$, the flow advances to step S32 again, and the target temperature $T_{TRG}$ is changed. The change operation of the target temperature is performed up to 18° C. as a minimal value in the ventilation mode.

If NO in step S31, the flow advances to step S34 to check if the value ($F_2-5$) is equal to or smaller than the predetermined value ($-\alpha$). If YES in step S34 (e.g., $F_2 \leq 4$), it is determined that a state wherein a passenger feels cold is set, and the flow advances to step S35 to check if the value $F_2$ is equal to or smaller than 3. If NO in step S35, it is determined that although a rather cold state is set, this state can be adjusted by changing the target temperature $T_{TRG}$. Thus, in step S36, the target temperature $T_{TRG}$ is changed, i.e., is increased by the predetermined value $\Delta T$. In step S37, it is checked if the changed target temperature $T_{TRG}$ is equal to 27° C. as a maximal value in the ventilation mode. If NO in step S37, the flow returns to step S13, and an optimal outlet air temperature, and the like are calculated again on the basis of the changed target temperature $T_{TRG}$.

If YES is determined in step S35 or S37, it is determined that it is impossible to form an air-conditioned state having "$F_2 \leq 5$" in the ventilation mode, and the control enters the B/L1 mode (to be described below).

B/L1 Mode

Figure 6:
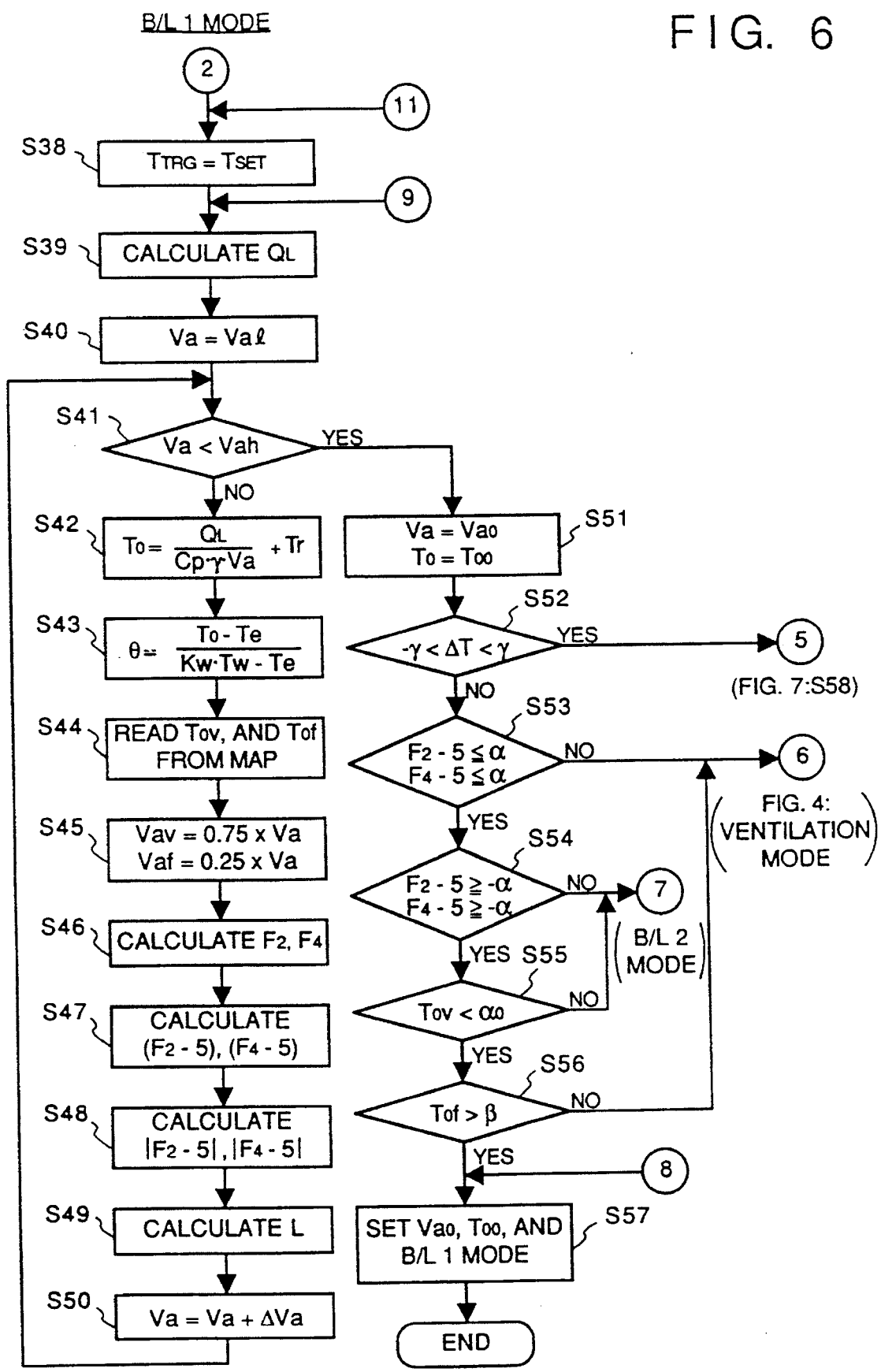
FIG. 6 is a flow chart showing an example of B/L1 mode control.
Figure 7:
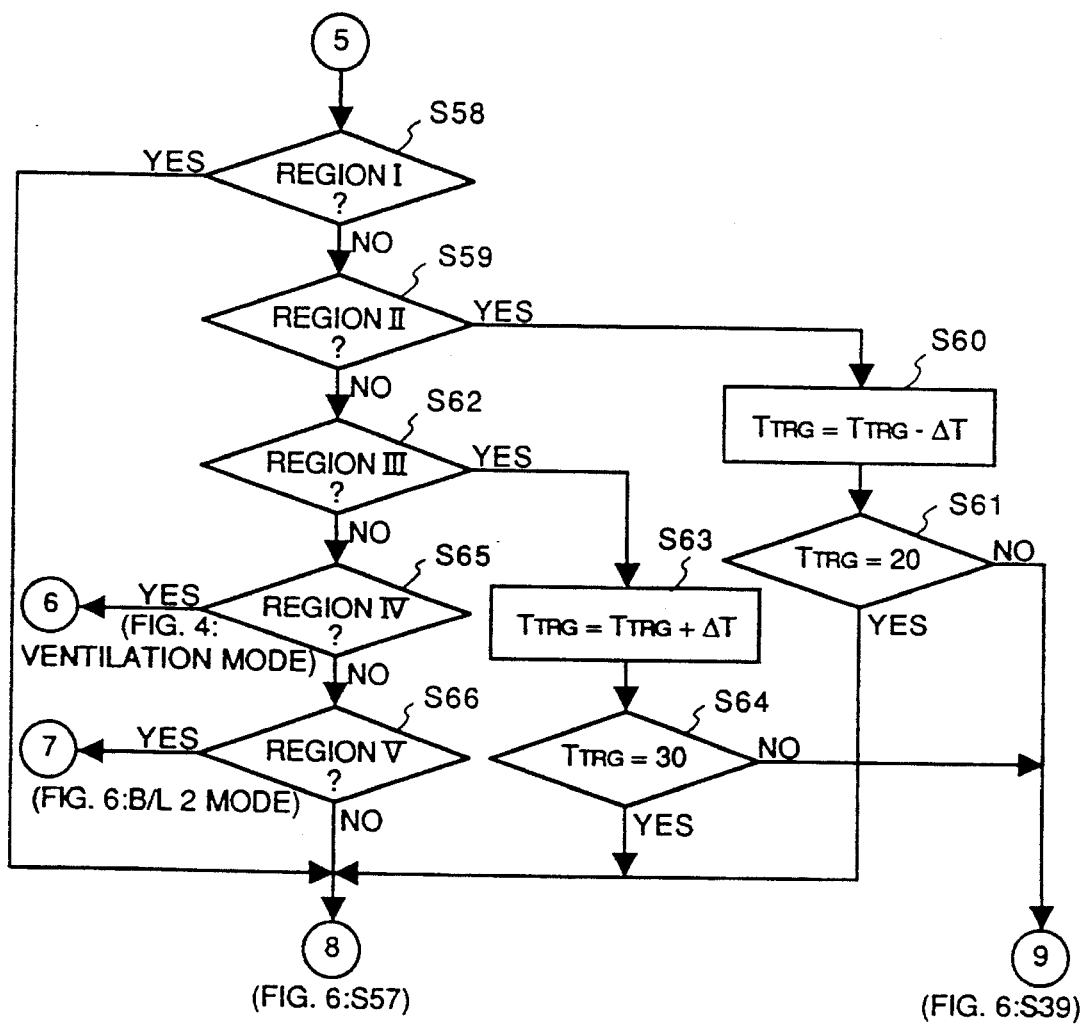
FIG. 7 is a flow chart showing details of target temperature change control in the B/L1 mode control.
Figure 17:
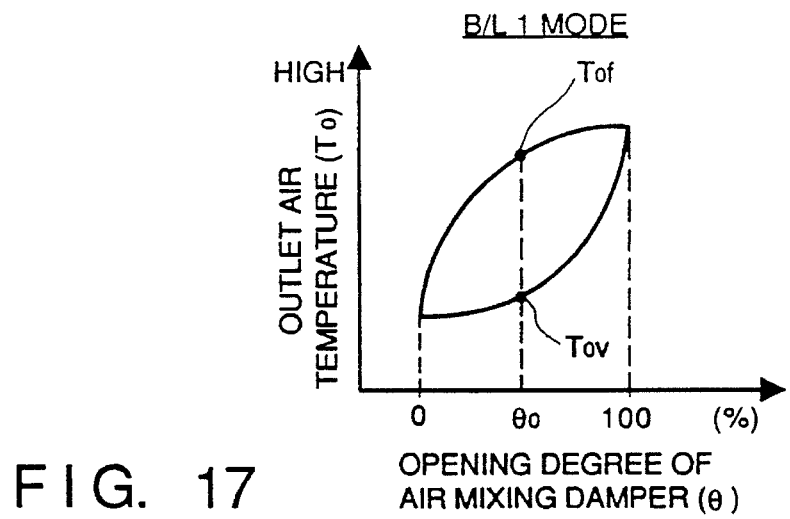
FIG. 17 is a graph showing the relationship between the outlet air temperature of air-conditioning air output from a foot outlet port, and the outlet air temperature of air-conditioning air output from a ventilation outlet port in the B/L1 mode.

FIGS. 6 and 7 show a routine for setting the B/L1 mode. In the B/L1 mode, 75% air-conditioning air is output from the ventilation outlet port 5, and 25% air-conditioning air is output from the foot outlet port 6. More specifically, when an outlet air flow rate $V_a$ is set, ait is output from the ventilation outlet port 5 at a flow rate $V_{av} = 0.75 \times V_a$, and air is output from the foot outlet port 6 at a flow rate $V_{af} = 0.25 \times V_a$. The outlet air temperature of air-conditioning air output from the ventilation outlet port 5 is represented by "$T_{ov}$", and the outlet air temperature of air-conditioning air output from the foot outlet port 6 is represented by "$T_{of}$". In this case, the relationship between $T_{ov}$ and $T_{of}$ is as shown in FIG. 17. More specifically, when an outlet air temperature $T_o$ is set, air-conditioning air at the temperature $T_{ov}$ is output from the ventilation outlet port 5, and air-conditioning air at the temperature $T_{of}$ is output from the foot outlet port 6 according to the opening degree $\theta_o$ of the air mixing damper 13 corresponding to this outlet air temperature $T_o$. Upon comparison between $T_{ov}$ and $T_{of}$, as can be seen from FIG. 17, air-conditioning air output from the ventilation outlet port 5 is set at a lower temperature than that output from the foot outlet port 6, thus realizing the effect of keeping the head cold and the feet warm.

The B/L1 mode premised on the above description will be described in detail below.

In step S38, the setting temperature $T_{SET}$ is set to be the target temperature $T_{TRG}$, and thereafter, in step S39, a vehicle heat load $Q_L$ is calculated using the equation in the unstable period.

Steps S40 to S50 are basically the same as the above-mentioned processing in steps S14 to S24 (FIG. 4), and are executed to obtain a combination of the outlet air temperature $T_o$ and the outlet air flow rate $V_a$.

More specifically, after the outlet air flow rate $V_a$ is set to be the low air flow rate Val in step S38, an outlet air temperature $T_{o1}$ corresponding to the low air flow rate $V_{a1}$ is calculated in step S42. In step S43, an opening degree $\theta$ of the air mixing damper 13 is calculated based on $T_{o1}$. In step S44, the outlet air temperature $T_{ov}$ of the ventilation outlet port 5 and the outlet air temperature $T_{of}$ of the foot outlet port 6 corresponding to the opening degree $\theta$ are read from the map shown in FIG. 17. In step S45, an outlet air flow rate $V_{av}$ of air-conditioning air output from the ventilation outlet port 5 and an outlet air flow rate $V_{af}$ of air-conditioning air output from the foot outlet port 6 are calculated.

In step S46, a comfort index F is calculated, as will be described later. In this case, as the comfort index F, the above-mentioned index $F_2$, and a second index $F_4$ as a comfort index for the foot outlet port 6 are used. The second comfort index $F_4$ is obtained by converting, into an index, a comfort level felt by a passenger when air-conditioning air is output from the foot outlet port 6. More specifically, in an equation expressing the comfort index F ($F = K_1 \cdot V_a + K_2 \cdot T_o + K_3 \cdot T_a + K_4 \cdot T_r + K_5 \cdot T_s$), the weighting coefficients $K_1$ to $K_5$ are set on the basis of air-conditioning air output from the foot outlet port 6. Therefore, the foot comfort index $F_4$ mainly represents the comfort level at the legs of the passenger.

Premised on the above description, in calculation of the value F in step S46, the ventilation index $F_2$ is calculated on the basis of the outlet air flow rate $V_{av}$ and the outlet air temperature $T_{ov}$ of the ventilation outlet port 5, and the foot index $F_4$ is calculated on the basis of the outlet air flow rate $V_{af}$ and the outlet air temperature $T_{of}$ of the foot outlet port 6.

Figure 18:
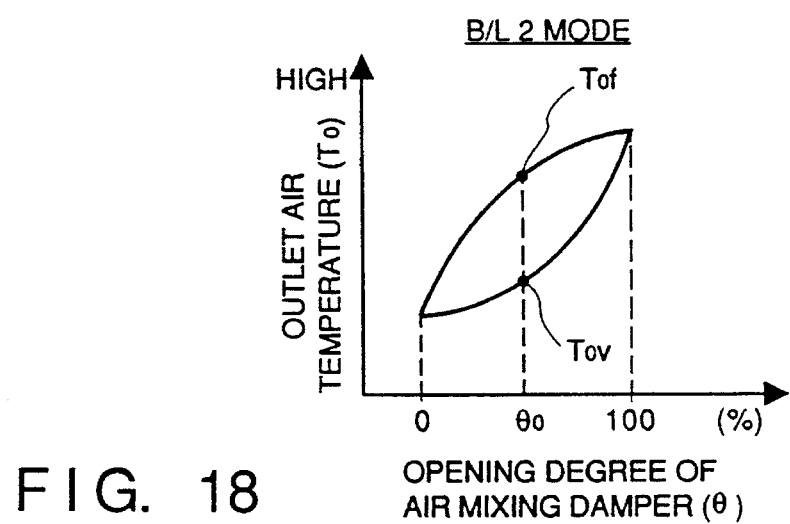
FIG. 18 is a graph showing the relationship between the outlet air temperature of air-conditioning air output from the foot outlet port, and the outlet air temperature of air-conditioning air output from the ventilation outlet port in the B/L2 mode.

In step S47, a deviation ($F_2$–5) between the value $F_2$ and 5, and a deviation ($F_4$–5) between the value $F_4$ and 5 are calculated. In this case, since the total comfort level felt by a passenger is evaluated using the two indices $F_2$ and $F_4$, a point where both $F_2$ and $F_4$ indicate "5" is represented by "O", as shown in FIG. 18, and a point indicated by the values ($F_2$–5) and ($F_4$–5) is represented by "P". In this case, the total comfort level is evaluated by a distance L between the point "P" and the most comfortable point "O".

For this reason, in step S49, the distance L is calculated by an equation $L^2=(F_2-5)^2+(F_4-5)^2$. Thereafter, in step S50, $\Delta V$ is added to the outlet air flow rate $V_{a1}$, and the above-mentioned processing in steps S39 to S50 is repeated until the maximum air flow rate $V_{ah}$ ($V_{a7}$) is reached. With this series of processing operations, the outlet air temperatures and the values L corresponding to the outlet air flow rates are obtained like ($V_{a1}$, $T_{o1}$, and the distance L), ($V_{a2}$, $T_{o2}$, and the distance L), . . . .

Upon completion of the processing for obtaining the combinations, the flow advances from step S41 to step S51, and an optimal combination of the outlet air flow rate $V_{ao}$ and the outlet air temperature $T_{oo}$ having the minimum distance L is selected.

In step S52, it is checked based on the above-mentioned $\Delta T$ ($=T_r-T_{TRG}$) if an air-conditioned state has reached a stable period. If NO in step S52, it is determined that an air-conditioned state is still in an unstable period, and the flow advances to step S53 to check based on the optimal outlet air flow rate $V_{ao}$ and outlet air temperature $T_{oo}$ if both the values ($F_2$–5) and ($F_4$–5) are equal to or smaller than the predetermined value $\alpha$ (e.g., $\alpha$=1). If YES in step S53 (both $F_2$ and $F_4$ are 6 or less), it is checked in step S54 if both the values ($F_2$–5) and ($F_4$–5) based on the optimal outlet air flow rate $V_{ao}$ and outlet air temperature $T_{oo}$ are equal to or larger than the predetermined value ($-\alpha$). If YES in step S54 (both $F_2$ and $F_4$ are 4 or more), it is determined that both the comfort index $F_2$ obtained by air-conditioning air output from the ventilation outlet port 5, and the comfort index $F_4$ obtained by air-conditioning air output from the foot outlet port 6 are equal to or closer to "5". In step S55, it is confirmed if the outlet air temperature $T_{ov}$ of the ventilation outlet port 5 is lower than the predetermined temperature $\alpha_o$ (e.g., $\alpha_o$=30° C.). In step S56, it is checked if the outlet air temperature $T_{of}$ of the foot outlet port 6 is higher than a predetermined temperature $\beta$ (e.g., $\beta$=20° C.). If YES in both steps S55 and S56, the combination of the optimal outlet air flow rate $V_{ao}$ and the optimal outlet air temperature $T_{oo}$, and the B/L1 mode are set in step S57.

If NO in step S53, it is determined that a passenger feels that both his or her bust and legs are hot, and the control returns to the above-mentioned ventilation mode (step S12 in FIG. 4). If NO in step S56, it is determined that cold air-conditioning air is output from the foot outlet port 6, and a passenger feels that his or her legs are cold. Thus, the control also returns to the ventilation mode (step S12 in FIG. 4).

Figure 8:
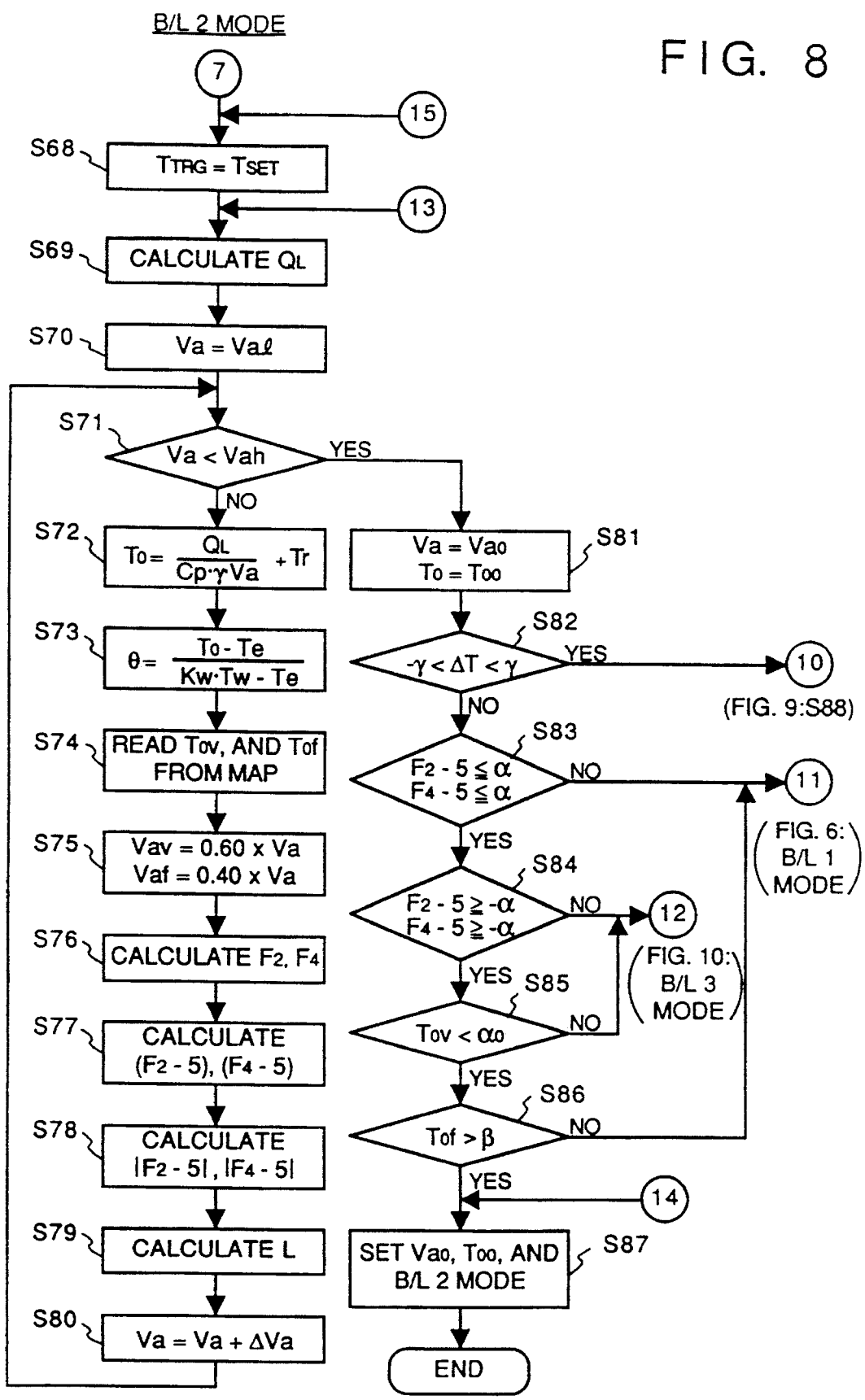
FIG. 8 is a flow chart showing an example of B/L2 mode control.

If NO in step S54, it is determined that a passenger feels that both his or her bust and legs are cold, and the control enters a B/L2 mode (FIG. 8; to be described later). If NO in step S55, it is determined that a passenger feels discomfort since hot air-conditioning air blows against his or her face, and the control also enters the B/L2 mode.

If YES in step S52, i.e., if the difference between the passenger room temperature $T_r$ and the target temperature $T_{TRG}$ is small, it is determined that an air-conditioned state has nearly reached a stable period, and the flow advances to step S58 and subsequent steps shown in FIG. 7.

The processing in step S58 and subsequent steps is executed for correcting the target temperature $T_{TRG}$. In step S58, region discrimination is performed based on the map shown in FIG. 20. If it is determined that the point P falls within a region I shown in FIG. 20 (YES in step S58), the flow returns to step S57 in FIG. 6, and the B/L1 mode, the outlet air temperature $T_{oo}$, and the like are set.

Figure 20:
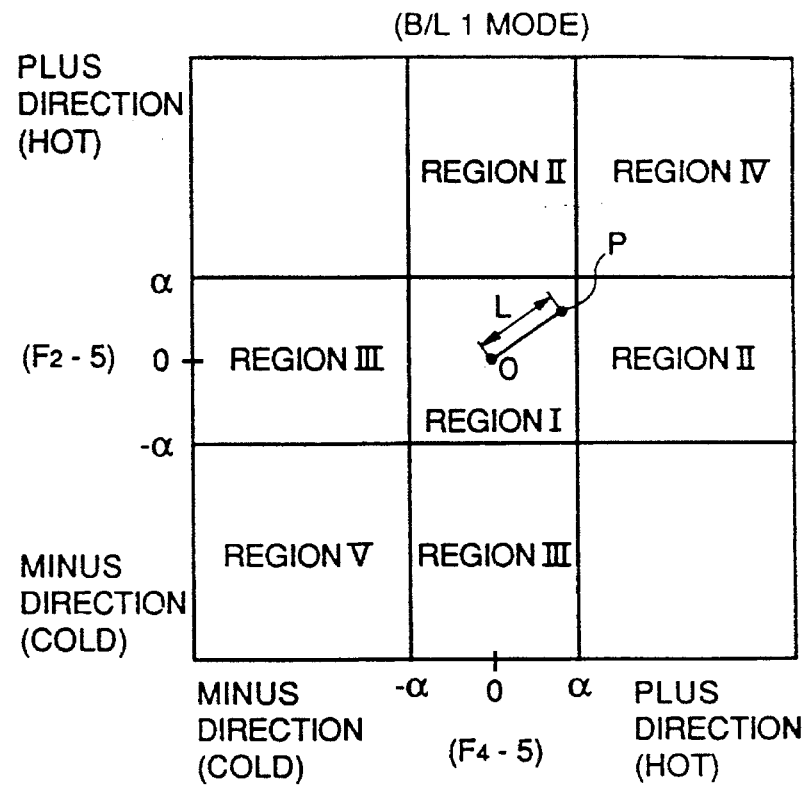
FIG. 20 shows a control map used in region discrimination in the B/L1 mode.

On the other hand, if NO in step S58, the flow advances to step S59 to check if the point P falls within a region II shown in FIG. 20. If YES in step S59, it is determined that a state wherein a passenger feels that his or her bust is hot although he or she feels that his or her legs are comfortable, or vice versa is set, and the flow advances to step S60. In step S60, the target temperature $T_{TRG}$ is changed, i.e., is decreased by the predetermined value $\Delta T$. In step S61, it is checked if the changed target temperature $T_{TRG}$ is equal to 20° C. If NO in step S61, an optimal outlet air temperature, and the like are calculated again on the basis of the changed target temperature $T_{TRG}$.

When both the values of the indices $F_2$ and $F_4$ obtained by the optimal outlet air temperature $T_{oo}$ and the optimal outlet air flow rate $V_{ao}$ calculated based on the changed target temperature $T_{TRG}$ become substantially equal to "$\cong 5$" (region I), it is determined that the optimal air-conditioned state has been found by changing the target temperature $T_{TRG}$, and the flow advances from step S58 to step S57 (FIG. 6).

On the other hand, if it is determined in step S59 regardless of the changed target temperature $T_{TRG}$ that the point P falls within the region II (YES in step S59), the target temperature $T_{TRG}$ is changed again ($T_{TRG}-\Delta T$) in step S60. The target temperature is changed up to 20° C. as a minimal value of the target temperature in the B/L1 mode.

If NO in step S59, the flow advances to step S62 to check if the point P falls within a region III shown in FIG. 20. If YES in step S62 (region III), it is determined that a state wherein a passenger feels that his or her bust is cold although he or she feels that his or her legs are comfortable, or vice versa is set. In step S63, the target temperature $T_{TRG}$ is changed, i.e., is increased by the predetermined value $\Delta T$. In step S64, it is checked if the changed target temperature $T_{TRG}$ is equal to 30° C. as a maximal value in the B/L1 mode. If NO in step S64, the flow returns to step S39 (FIG. 6), and an optimal outlet air temperature, and the like are calculated based on the changed target temperature $T_{TRG}$.

If NO in step S62, the flow advances to step S65 to check if the point P falls within a region IV. If YES in step S65 (region IV), it is determined that a state wherein a passenger feels that both his or her bust and legs are hot is set, and the control returns to the ventilation mode (step S12 in FIG. 4). On the other hand, if NO in step S65, the flow advances to step S66 to check if the point P falls within a region V. If YES in step S66 (region V), it is determined that a state wherein a passenger feels that both his or her bust and legs are cold is set, and the control enters the B/L2 mode (step S68 in FIG. 8; to be described later). On the other hand, if NO in step S66, the flow advances to step S57 described above.

B/L2 Mode

Figure 9:
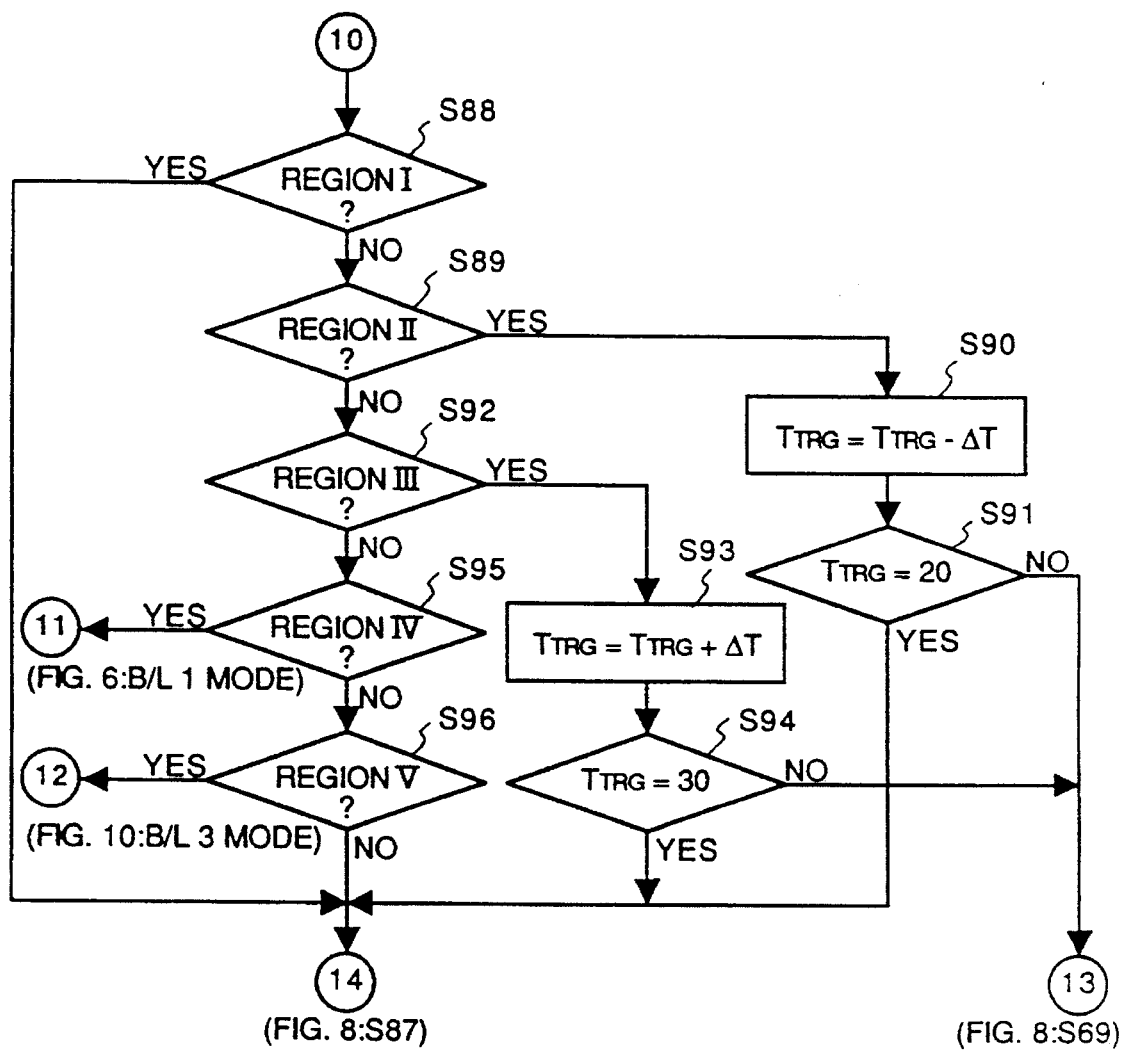
FIG. 9 is a flow chart showing details of target temperature change control in the B/L2 mode control.

FIGS. 8 and 9 show a routine for setting the B/L2 mode. In the B/L2 mode, 60% air-conditioning air is output from the ventilation outlet port 5, and 40% air-conditioning air is output from the foot outlet port 6. More specifically, when an outlet air flow rate $V_a$ is set, air is output from the ventilation outlet port 5 at a flow rate $V_{av}=0.60 \times V_a$, and air is output from the foot outlet port 6 at a flow rate $V_{af}=0.40 \times V_a$. The relationship between the outlet air temperature $T_{ov}$ output from the ventilation outlet port 5 and the outlet air temperature $T_{of}$ output from the foot outlet port 6 is as shown in FIG. 18.

The B/L2 mode premised on the above description will be described in detail below.

Steps S68 to S80 shown in FIG. 8 correspond to steps S38 to S50 (B/L1 mode; see FIG. 6) described above. In these steps, since steps having common numerals at the one's digit of their step numbers execute the same processing, a description thereof will be omitted. Note that the equation in step S75 corresponds to the fact that the outlet ratio of air-conditioning air of the ventilation outlet port 5 is 60%, and that of the foot outlet port 6 is 40%.

Steps S81 to S87 shown in FIG. 8 correspond to steps S51 to S57 in the B/L1 mode. In these steps, since steps having common numerals at the one's digit of their step numbers execute the same processing, a description thereof will be omitted. In step S87, of course, the B/L2 mode is set.

If NO is determined in step S83, it is determined that a state wherein a passenger feels that both his or her bust and legs are hot is set, and the control returns to the above-mentioned B/L1 mode (step S38 in FIG. 6). If NO is determined in step S86, it is determined that a state wherein a passenger feels that his or her legs are cold is set since cold air-conditioning air is output from the foot outlet port 6, and the control also returns to the B/L1 mode (step S38 in FIG. 6).

Figure 10:
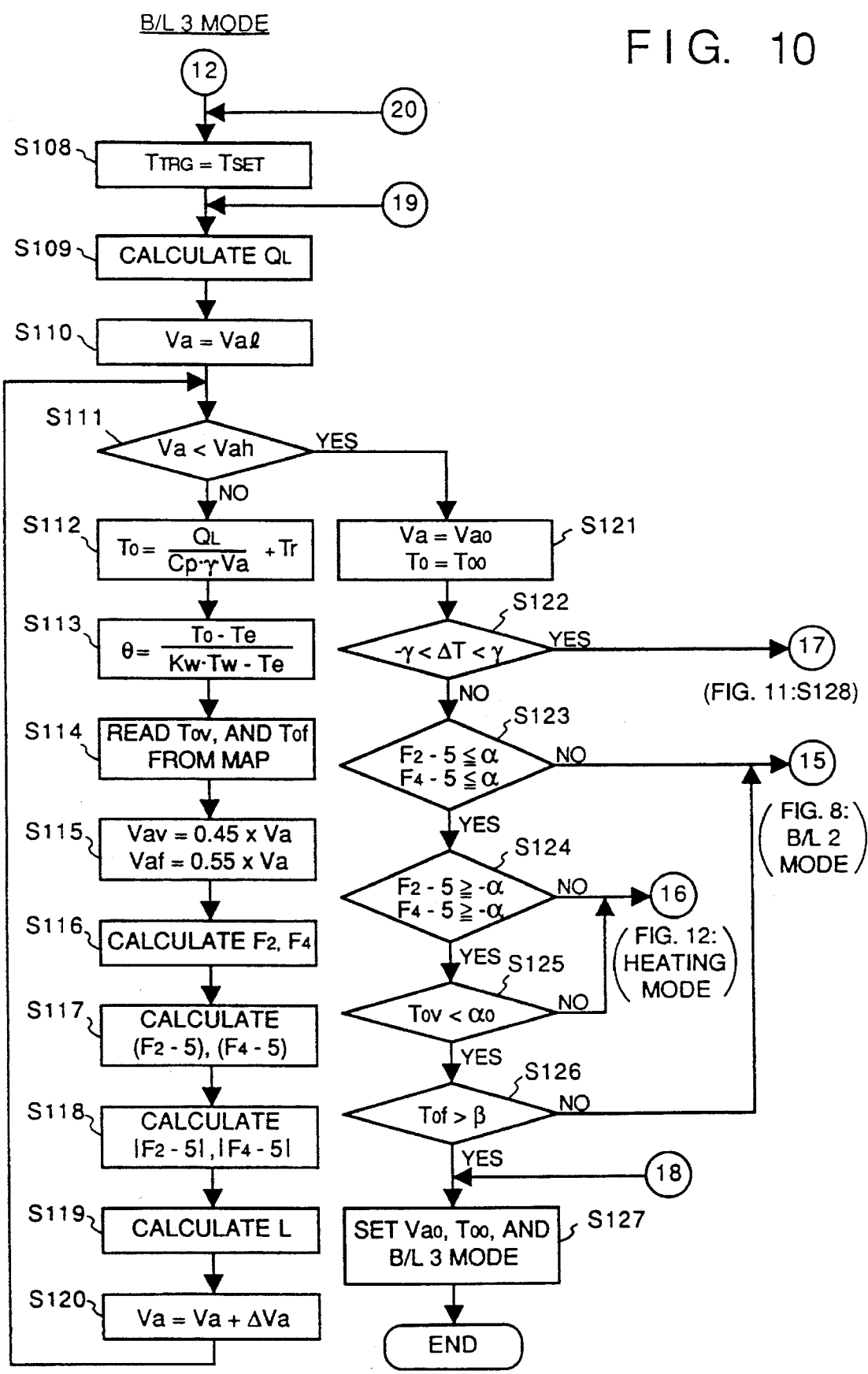
FIG. 10 is a flow chart showing an example of B/L3 mode control.

Furthermore, if NO is determined in step S84, it is determined that a state wherein a passenger feels that both his or her bust and legs are cold is set, and the control enters a B/L3 mode (FIG. 10; to be described later). If NO is determined in step S85, it is determined that a passenger feels discomfort since hot air-conditioning air blows against his or her face, and the control also enters the B/L3 mode.

If YES is determined in step S82, i.e., if the difference between the passenger room temperature $T_r$ and the target temperature $T_{TRG}$ is small, it is determined that an air-conditioned state has nearly reached a stable period, and the flow advances to step S88 and subsequent steps shown in FIG. 9.

In the processing in step S88 and subsequent steps, the target temperature $T_{TRG}$ is corrected by the same technique as in the B/L1 mode. Steps S88 to S96 correspond to steps S58 to S66 (B/L1 mode; see FIG. 7) described above. In these steps, since steps having common numerals at the one's digit of their step numbers execute basically the same processing, a description thereof will be omitted.

Figure 21:
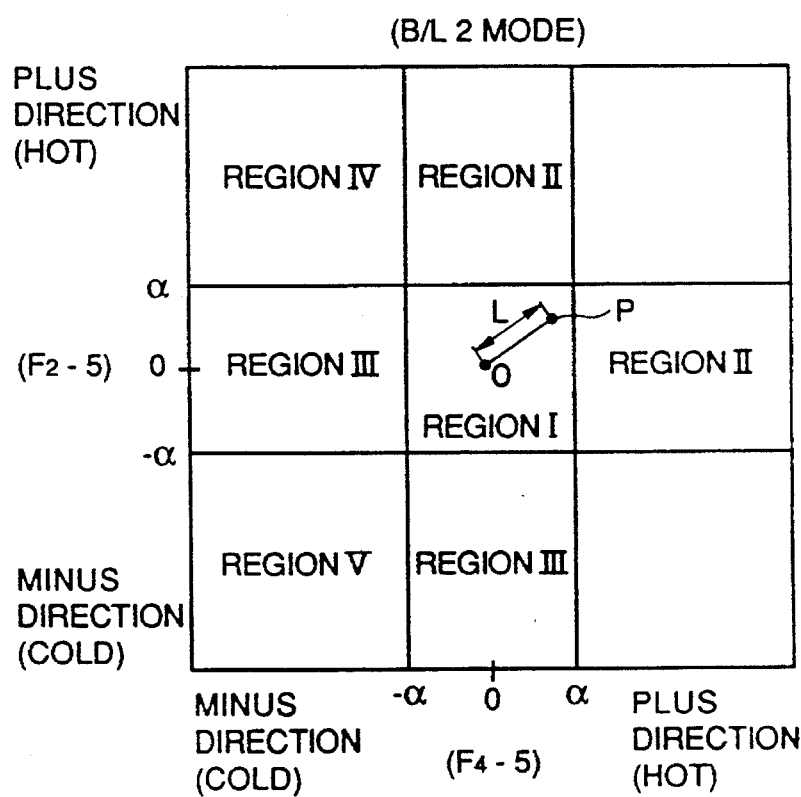
FIG. 21 shows a control map used in region discrimination in the B/L2 mode.

In step S88, region discrimination is performed based on a map shown in FIG. 21. If it is determined that the point P falls within a region I shown in FIG. 21 (YES in step S88), the flow returns to step S87 shown in FIG. 8, and the B/L2 mode, the outlet air temperature $T_{oo}$, and the like are set.

On the other hand, if NO in step S88, the flow advances to step S89 to check if the point P falls within a region II shown in FIG. 21. If YES in step S89, it is determined that a state wherein a passenger feels that his or her bust is hot although he or she feels that his or her legs are comfortable, or vice versa is set, and the flow advances to step S90. In step S90, the target temperature $T_{TRG}$ is changed, i.e., is decreased by the predetermined value $\Delta T$. In step S91, it is checked if the changed target temperature $T_{TRG}$ is equal to 20° C. If NO in step S91, an optimal outlet air temperature, and the like are calculated again on the basis of the changed target temperature $T_{TRG}$.

When both the values of the indices $F_2$ and $F_4$ obtained by the optimal outlet air temperature $T_{oo}$ and the optimal outlet air flow rate $V_{ao}$ calculated based on the changed target temperature $T_{TRG}$ become substantially equal to "≅5" (region I), it is determined that an optimal air-conditioned state has been found by changing the target temperature $T_{TRG}$, and the flow advances from step S88 to step S87 (FIG. 8).

On the other hand, if it is determined in step S89 regardless of the changed target temperature $T_{TRG}$ that the point P falls within the region II (YES in step S89), the target temperature $T_{TRG}$ is changed again ($T_{TRG}-\Delta T$) in step S90. The target temperature is changed up to 20° C. as a minimal value of the target temperature in the B/L2 mode.

If NO in step S89, the flow advances to step S92 to check if the point P falls within a region III shown in FIG. 21. If YES in step S92 (region III), it is determined that a state wherein a passenger feels that his or her bust is cold although he or she feels that his or her legs are comfortable, or vice versa is set. In step S93, the target temperature $T_{TRG}$ is changed, i.e., is increased by the predetermined value $\Delta T$. In step S94, it is checked if the changed target temperature $T_{TRG}$ is equal to 30° C. as a maximal value in the B/L2 mode. If NO in step S94, the flow returns to step S69 (FIG. 8), and an optimal outlet air temperature, and the like are calculated based on the changed target temperature $T_{TRG}$.

If NO in step S92, the flow advances to step S95 to check if the point P falls within a region IV. If YES in step S95 (region IV), it is determined that a state wherein a passenger feels that his or her bust is hot, and his or her legs are cold is set, and the control returns to the B/L1 mode (step S38 in FIG. 6). On the other hand, if NO in step S95, the flow advances to step S96 to check if the point P falls within a region V. If YES in step S96 (region V), it is determined that a state wherein a passenger feels that both his or her bust and legs are cold is set, and the control enters a B/L3 mode (step S108 in FIG. 10; to be described later). On the other hand, if NO in step S96, the flow advances to step S87 described above.

B/L3 Mode

Figure 11:
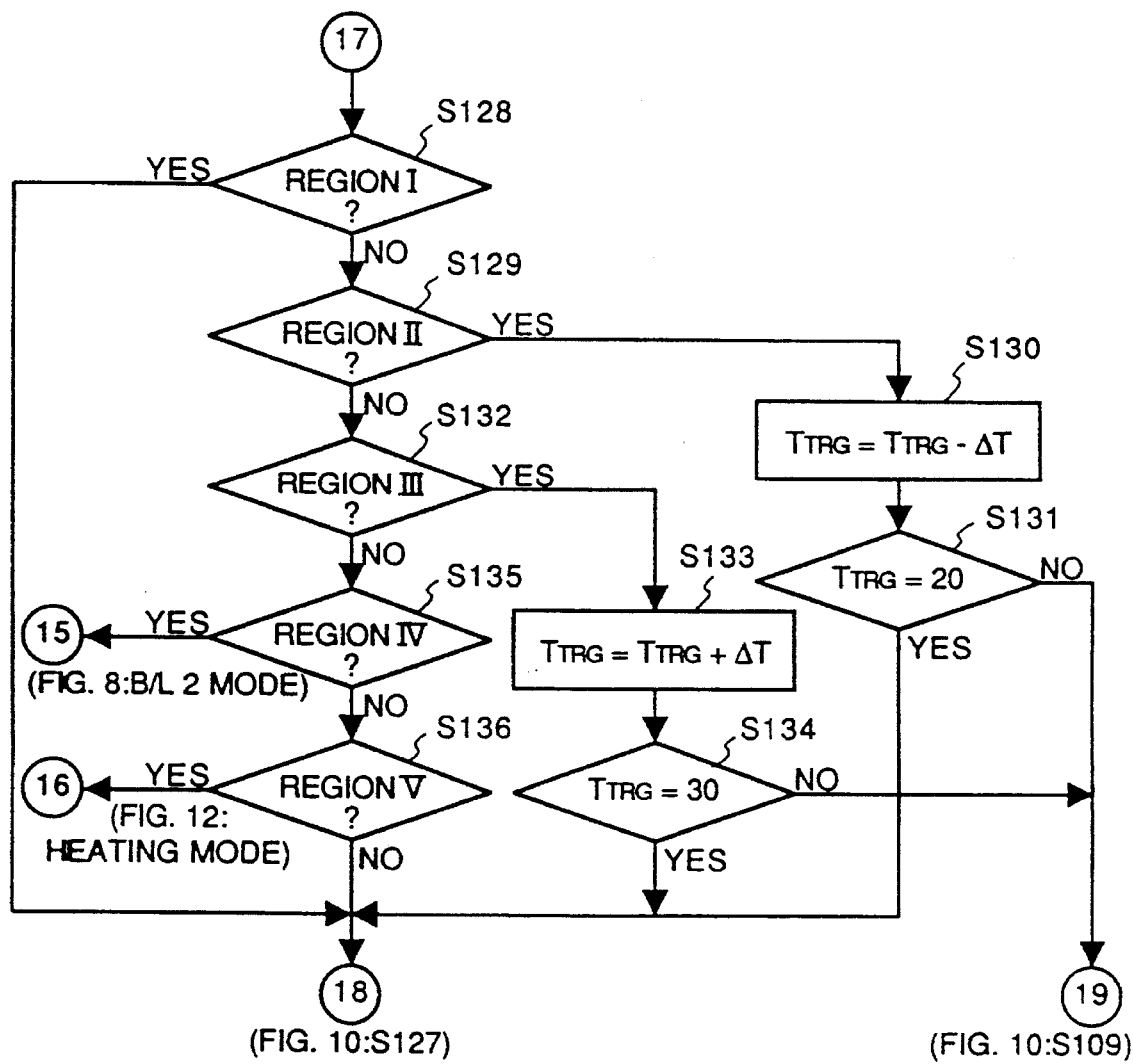
FIG. 11 is a flow chart showing details of target temperature change control in the B/L3 mode control.
Figure 19:
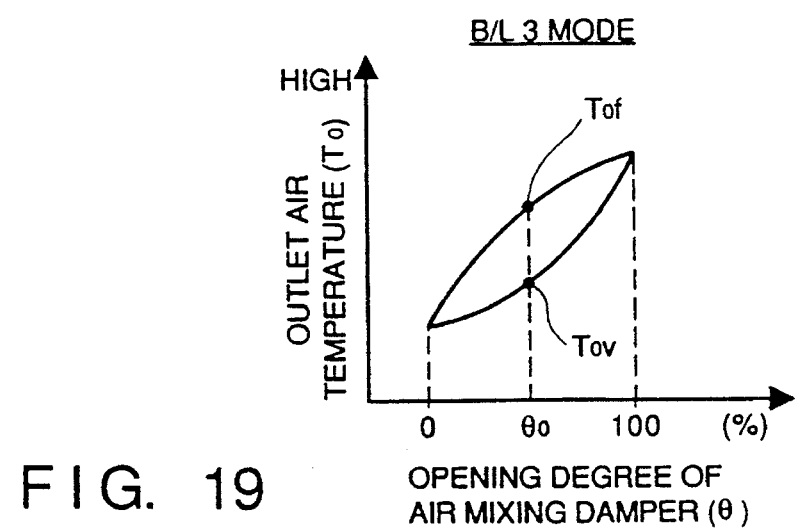
FIG. 19 is a graph showing the relationship between the outlet air temperature of air-conditioning air output from the foot outlet port, and the outlet air temperature of air-conditioning air output from the ventilation outlet port in the B/L3 mode.

FIGS. 10 and 11 show a routine for setting the B/L3 mode. In the B/L3 mode, 45% air-conditioning air is output from the ventilation outlet port 5, and 55% air-conditioning air is output from the foot outlet port 6. More specifically, when an outlet air flow rate $V_a$ is set, air is output from the ventilation outlet port 5 at a flow rate $V_{av}=0.45 \times V_a$, and air is output from the foot outlet port 6 at a flow rate $V_{af}=0.55 \times V_a$. The relationship between the outlet air temperature $T_{ov}$ output from the ventilation outlet port 5 and the outlet air temperature $T_{of}$ output from the foot outlet port 6 is as shown in FIG. 19.

The B/L3 mode premised on the above description will be described in detail below.

Steps S108 to S120 shown in FIG. 10 correspond to steps S38 to S50 (B/L1 mode; see FIG. 6) described above. In these steps, since steps having common numerals at the one's digit of their step numbers execute the same processing, a description thereof will be omitted. Note that the equation in step S115 corresponds to the fact that the outlet ratio of air-conditioning air of the ventilation outlet port 5 is 45%, and that of the foot outlet port 6 is 55%.

Steps S121 to S127 shown in FIG. 10 correspond to steps S51 to S57 in the B/L1 mode. In these steps, since steps having common numerals at the one's digit of their step numbers execute the same processing, a description thereof will be omitted. In step S127, of course, the B/L3 mode is set.

If NO is determined in step S123, it is determined that a state wherein a passenger feels that both his or her bust and legs are hot is set, and the control returns to the above-mentioned B/L2 mode (step S68 in FIG. 8). If NO is determined in step S126, it is determined that a state wherein a passenger feels that his or her legs are cold is set since cold air-conditioning air is output from the foot outlet port 6, and the control also returns to the B/L2 mode (step S68 in FIG. 8).

Figure 12:
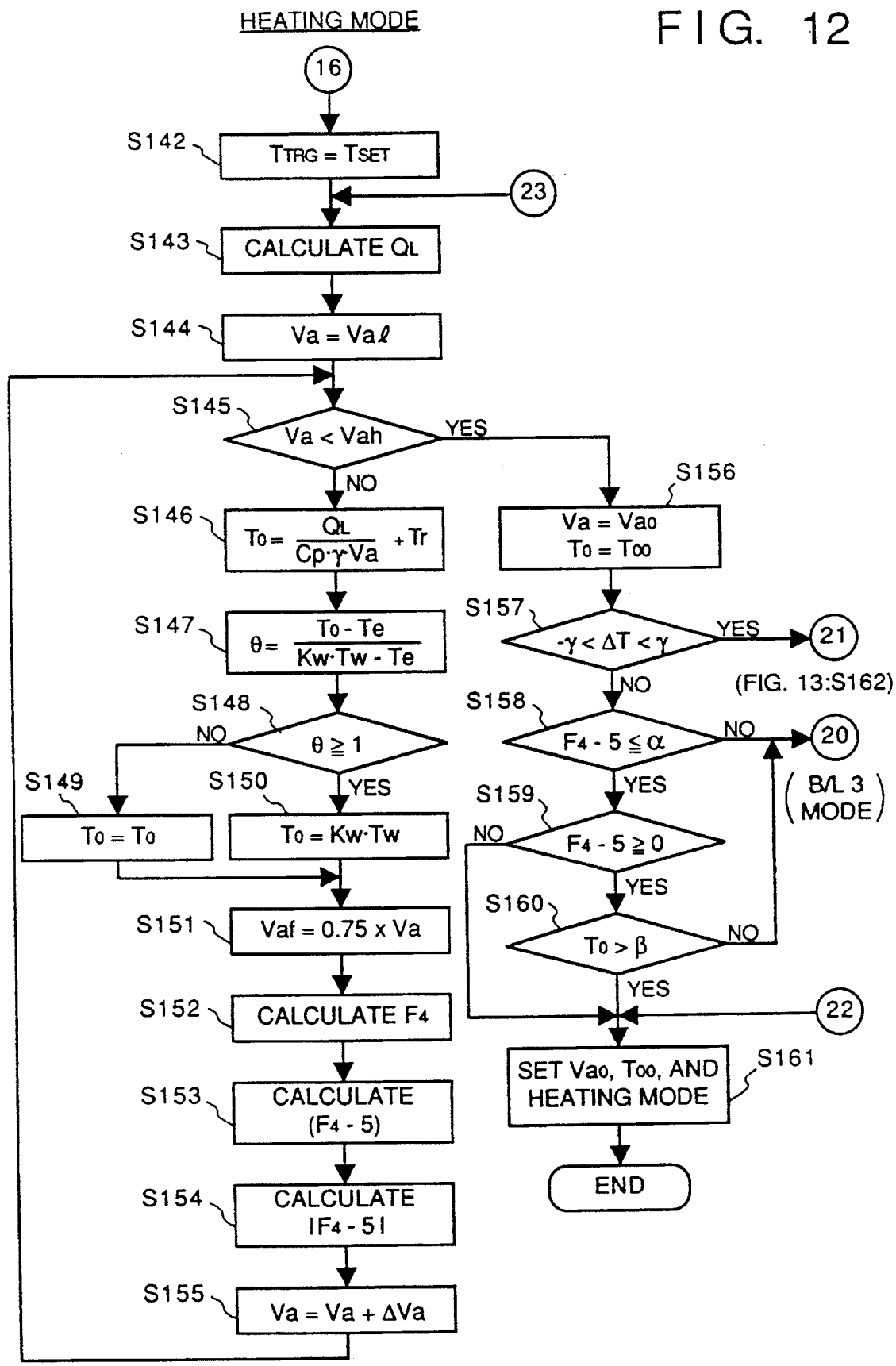
FIG. 12 is a flow chart showing an example of heating mode control.

Furthermore, if NO is determined in step S124, it is determined that a state wherein a passenger feels that both his or her bust and legs are cold is set, and the control enters a heating mode (FIG. 12; to be described later). If NO is determined in step S125, it is determined that a passenger feels discomfort since hot air-conditioning air blows against his or her face, and the control also enters the heating mode.

If YES is determined in step S122, i.e., if the difference between the passenger room temperature $T_r$ and the target temperature $T_{TRG}$ is small, it is determined that an air-conditioned state has nearly reached a stable period, and the flow advances to step S128 and subsequent steps shown in FIG. 11.

In the processing in step S128 and subsequent steps, the target temperature $T_{TRG}$ is corrected by the same technique as in the B/L1 mode. Steps S128 to S136 correspond to steps S58 to S66 (B/L1 mode; see FIG. 7) described above. In these steps, since steps having common numerals at the one's digit of their step numbers execute basically the same processing, a description thereof will be omitted.

Figure 22:
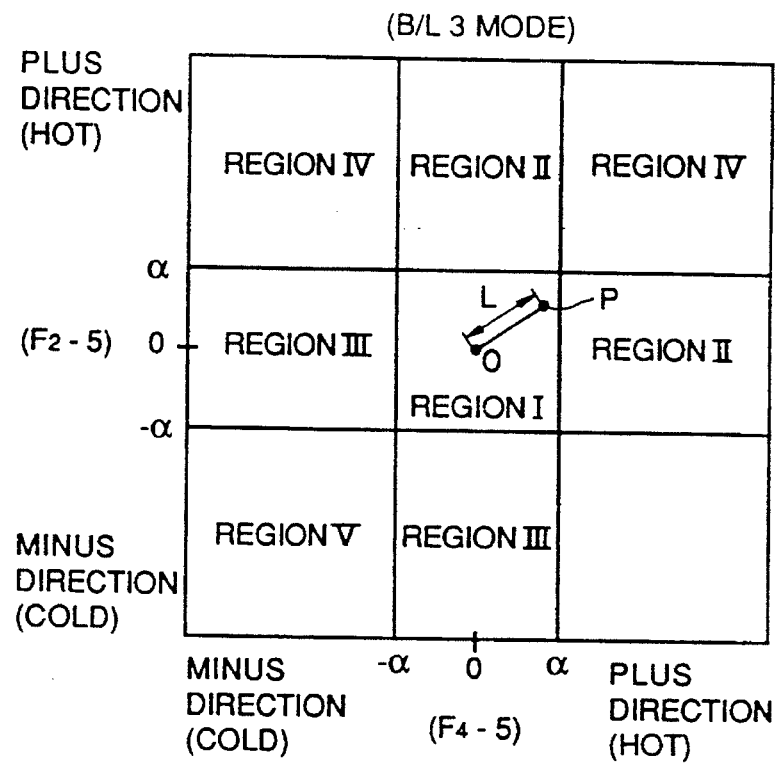
FIG. 22 shows a control map used in region discrimination in the B/L3 mode.

In step S128, region discrimination is performed based on a map shown in FIG. 22. If it is determined that the point P falls within a region I shown in FIG. 22 (YES in step S128), the flow returns to step S127 shown in FIG. 10, and the B/L3 mode, the outlet air temperature $T_{oo}$, and the like are set.

On the other hand, if NO in step S128, the flow advances to step S129 to check if the point P falls within a region II shown in FIG. 22. If YES in step S129, it is determined that a state wherein a passenger feels that his or her bust is hot although he or she feels that his or her legs are comfortable, or vice versa is set, and the flow advances to step S130. In step S130, the target temperature $T_{TRG}$ is changed, i.e., is decreased by the predetermined value $\Delta T$. In step S131, it is checked if the changed target temperature $T_{TRG}$ is equal to 20° C. If NO in step S131, an optimal outlet air temperature, and the like are calculated again on the basis of the changed target temperature $T_{TRG}$.

When both the values of the indices $F_2$ and $F_4$ obtained by the optimal outlet air temperature $T_{oo}$ and the optimal outlet air flow rate $V_{ao}$ calculated based on the changed target temperature $T_{TRG}$ become substantially equal to "≅5" (region I), it is determined that an optimal air-conditioned state has been found by changing the target temperature $T_{TRG}$, and the flow advances from step S128 to step S127 (FIG. 10).

On the other hand, if it is determined in step S129 regardless of the changed target temperature $T_{TRG}$ that the point P falls within the region II (YES in step S129), the target temperature $T_{TRG}$ is changed again ($T_{TRG}-\Delta T$) in step S130. The target temperature is changed up to 20° C. as a minimal value of the target temperature in the B/L3 mode.

If NO in step S129, the flow advances to step S132 to check if the point P falls within a region III shown in FIG. 22. If YES in step S132 (region III), it is determined that a state wherein a passenger feels that his or her bust is cold although he or she feels that his or her legs are comfortable, or vice versa is set. In step S133, the target temperature $T_{TRG}$ is changed, i.e., is increased by the predetermined value $\Delta T$. In step S134, it is checked if the changed target temperature $T_{TRG}$ is equal to 30° C. as a maximal value in the. B/L3 mode. If NO in step S134, the flow returns to step S109 (FIG. 10), and an optimal outlet air temperature, and the like are calculated based on the changed target temperature $T_{TRG}$.

If NO in step S132, the flow advances to step S135 to check if the point P falls within a region IV. If YES in step S135 (region IV), it is determined that a state wherein a passenger feels that his or her bust is hot, and his or her legs are cold is set, and the control returns to the B/L2 mode (step S68 in FIG. 8). On the other hand, if NO in step S135, the flow advances to step S136 to check if the point P falls within a region V. If YES in step S136 (region V), it is determined that a state wherein a passenger feels that both his or her bust and legs are cold is set, and the control enters the heating mode (FIG. 12; to be described later). On the other hand, if NO in step S136, the flow advances to step S127 described above.

Heating Mode

Figure 13:
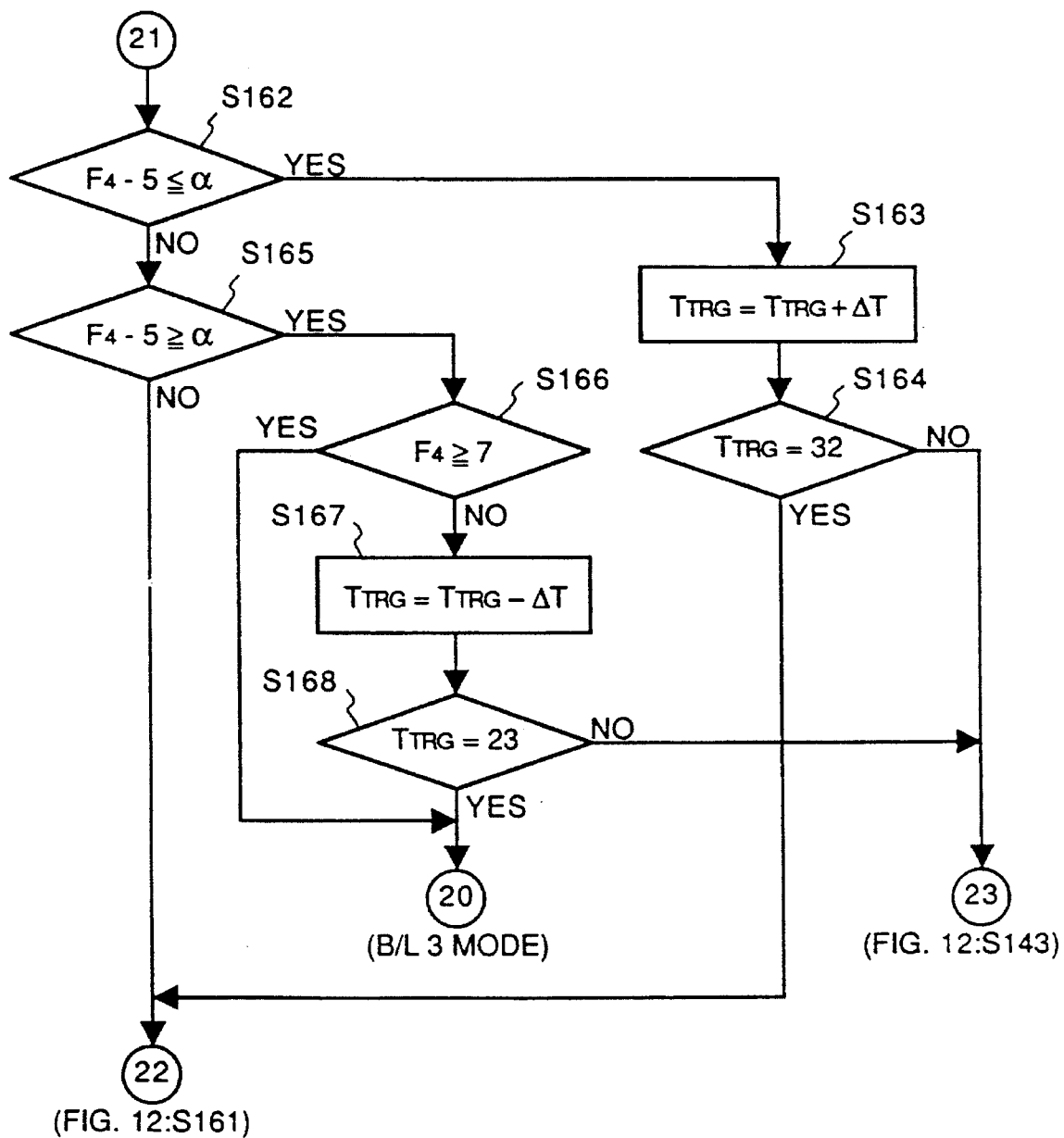
FIG. 13 is a flow chart showing details of target temperature change control in the heating mode control.

FIGS. 12 and 13 show a routine for setting the foot outlet port 6 (heating mode).

In step S142, the setting temperature $T_{SET}$ is set to be the target temperature $T_{TRG}$. In step S143, a vehicle heat load $Q_L$ is calculated using the equation in the unstable period. In step S144, the outlet air flow rate $V_a$ is set to be a low air flow rate $V_a1$ ($V_{a1}$). In step S146, an outlet air temperature $T_{o1}$ corresponding to the low air flow rate $V_{a1}$ is calculated. In step S147, an opening degree $\theta$ of the air mixing damper 13 is calculated on the basis of $T_{o1}$. In step S148, it is checked if the opening degree $\theta$ obtained in step S147 is equal to or larger than "1". If NO in step S148 ($\theta<1$), it is determined that an air mixing operation is performed, and in step S149, the outlet air temperature $T_{o1}$ is set as the outlet air temperature $T_o$. On the other hand, if YES in step S148 ($\theta\geq$"1"), it is determined that the air flow rate ratio to the heating heat exchanger 14 becomes 100% (full hot), and in step S150, the temperature $T_w$ of the engine cooling water is set as the outlet air temperature $T_o$. In the equation shown in step S150, the coefficient $K_w$ is used for converting the temperature $T_w$ of the engine cooling water into the exit temperature of the heating heat exchanger 14.

In step S151, an outlet air flow rate $V_{af}$ of air to be output from the foot outlet port 6 is calculated. More specifically, when the heating mode is set, air-conditioning air is output from the defroster outlet ports 7 in addition to the foot outlet port 6. In this case, the outlet air flow rate ratio of the foot outlet port 6 is set to be 75%, and that of the defroster outlet ports 7 is set to be 25%. More specifically, when an outlet air flow rate $V_a$ is set, air is output from the foot outlet port 6 at a flow rate $V_{af}=0.75\times V_a$. In step S152, a comfort index $F_4$ (as described above, the comfort index $F_4$ represents the comfort level obtained by air-conditioning air output from the foot outlet port 6) is calculated. In step S153, a deviation ($F_4-5$) between the value $F_4$ and 5 is calculated. In step S154, the absolute value of the deviation is calculated. Thereafter, in step S155, $\Delta V$ is added to the outlet air flow rate $V_{a1}$, and the processing in steps S146 to S154 is repeated until the maximum air flow rate $V_{ah}$ ($V_{a7}$) is reached. With this series of processing operations, the outlet air temperatures and the values F corresponding to the outlet air flow rates are obtained like ($V_{a1}$, $T_{o1}$, and the absolute value of the deviation ), ($V_{a2}$, $T_{o2}$, and the absolute value of the deviation) , . . . .

Upon completion of the processing for obtaining the combinations, the flow advances from step S145 to step S156, and a combination of the outlet air flow rate $V_a$ and the outlet air temperature $T_o$, which has the minimum absolute value of the deviation between the value $F_4$ and 5, is selected. More specifically, a combination of the outlet air flow rate and the outlet air temperature, which exhibits a value F closest to "$F_4$=4" (a state wherein a passenger feels most comfortable), is selected (selection of $V_{ao}$ and $T_{oo}$).

It is checked in step S157 if an air-conditioned state has reached a stable state. More specifically, it is checked if $\Delta T$ (=$T_r$=$T_{TRG}$) falls within a predetermined range. If NO in step S157, it is determined that the passenger room temperature $T_r$ deviates from the target temperature $T_{TRG}$ (e.g., the deviation is 2° C. or more), and the air-conditioned state is in an unstable period. Thus, the flow advances to step S158 to check if the value ($F_4$–5) is equal to or smaller than the predetermined value (e.g., $\alpha$=1). If YES in step S158 ($F_4$ based on $V_{ao}$ and $T_{oo}$ is 6 or less), the flow advances to step S159 to check if the value ($F_4$–5) is equal to or larger than zero ($F_4 \geq 5$). If NO in step S159 ($F_4$<5), it is determined that a state wherein a passenger feels that his or her legs are cold is set, and the flow advances to step S161. In step S161, the foot outlet port 6, and the combination ($V_{ao}$ and $T_{oo}$) of the outlet air flow rate and the outlet air temperature are set. In this manner, air-conditioning air is output from the foot outlet port 6 toward the legs of the passenger (heating mode). In this air-conditioned state, the air flow rate is set to be $V_{ao}$, and the temperature is set to be $T_{oo}$.

If YES in step S159, it is determined that the comfort index $F_4$ based on $V_{ao}$ and $T_{oo}$ is equal to or larger than 5, i.e., a state wherein a passenger feels that his or her legs are comfortable or hot is set. Thus, the flow advances to step S160 to check if the selected outlet air temperature $T_o$ is larger than the predetermined value $\beta$ (e.g., 20° C.). If YES in step S160, the flow advances to step S161. On the other hand, if NO in step S158, i.e., if $F_4$ is larger than 6, it is determined that a state wherein a passenger feels that his or her legs are hot is set, and the control enters the B/L3 mode. If NO in step S160, i.e., if the selected outlet air temperature $T_o$ is 20° C. or less, it is determined that it is not preferable that cold air blows against the feet of the passenger, and the control enters the B/L3 mode.

If YES in step S157, i.e., if the difference between the passenger room temperature $T_r$ and the target temperature $T_{TRG}$ is small, it is determined that an air-conditioned state has nearly reached a stable period, and the flow advances to step S162 and subsequent steps (see FIG. 13).

In the processing in step S162 and subsequent steps, the target temperature $T_{TRG}$ is corrected. In step S163, it is checked if the value ($F_4$–5) is equal to or smaller than the predetermined value ($-\alpha$; e.g., $\alpha$=1). If YES in step S163 ($F_4 \leq 4$), it is determined that a state wherein a passenger feels cold is set, and the flow advances to step S163 to change, i.e., increase the target temperature $T_{TRG}$ by the predetermined value $\Delta T$. In step S164, it is checked if the target temperature $T_{TRG}$ is equal to 32° C. If NO in step S164, the flow returns to step S143, and an optimal outlet air temperature, and the like are calculated on the basis of the changed target temperature $T_{TRG}$.

If the value of the comfort index $F_4$ obtained by the optimal outlet air temperature $T_{oo}$ and the optimal outlet air flow rate $V_{ao}$ calculated based on the changed target temperature $T_{TRG}$ becomes "the value F≅5", it is determined that an optimal air-conditioning controlled state has been found by changing the target temperature $T_{TRG}$, and the flow advances to step S161. On the other hand, if YES is determined in step S162 regardless of the changed target temperature $T_{TRG}$, the flow advances to step S163 again to change the target temperature $T_{TRG}$. The target temperature is changed up to 32° C. as a maximal value in the heating mode.

If NO in step S162 ($F_4$>4), the flow advances to step S165 to check if the value ($F_4$–5) is equal to or larger than the predetermined value $\alpha$. If YES in step S165 (e.g., F≧6), it is determined that a state wherein a passenger feels hot is set, and the flow advances to step S166 to check if the value $F_4$ is 7 or more. If NO in step S166, it is determined that a state wherein a passenger feels rather hot is set, and this state can be adjusted by changing the target temperature $T_{TRG}$. Thus, in step S167, the target temperature $T_{TRG}$ is changed, i.e., is decreased by the predetermined value $\Delta T$. In step S168, it is checked if the changed target temperature $T_{TRG}$ is equal to 23° C. as a minimal value in the heating mode. If NO in step S168, the flow returns to step S143, and an optimal outlet air temperature, and the like are calculated again on the basis of the changed target temperature $T_{TRG}$.

If YES in step S166, it is determined that too hot a state is set, and the control enters the B/L3 mode. If YES in step S168, it is determined that it is impossible to form an air-conditioned state having "$F_2 \leq 5$" in the heating mode, and the control enters the B/L3 mode.

Figure 15:
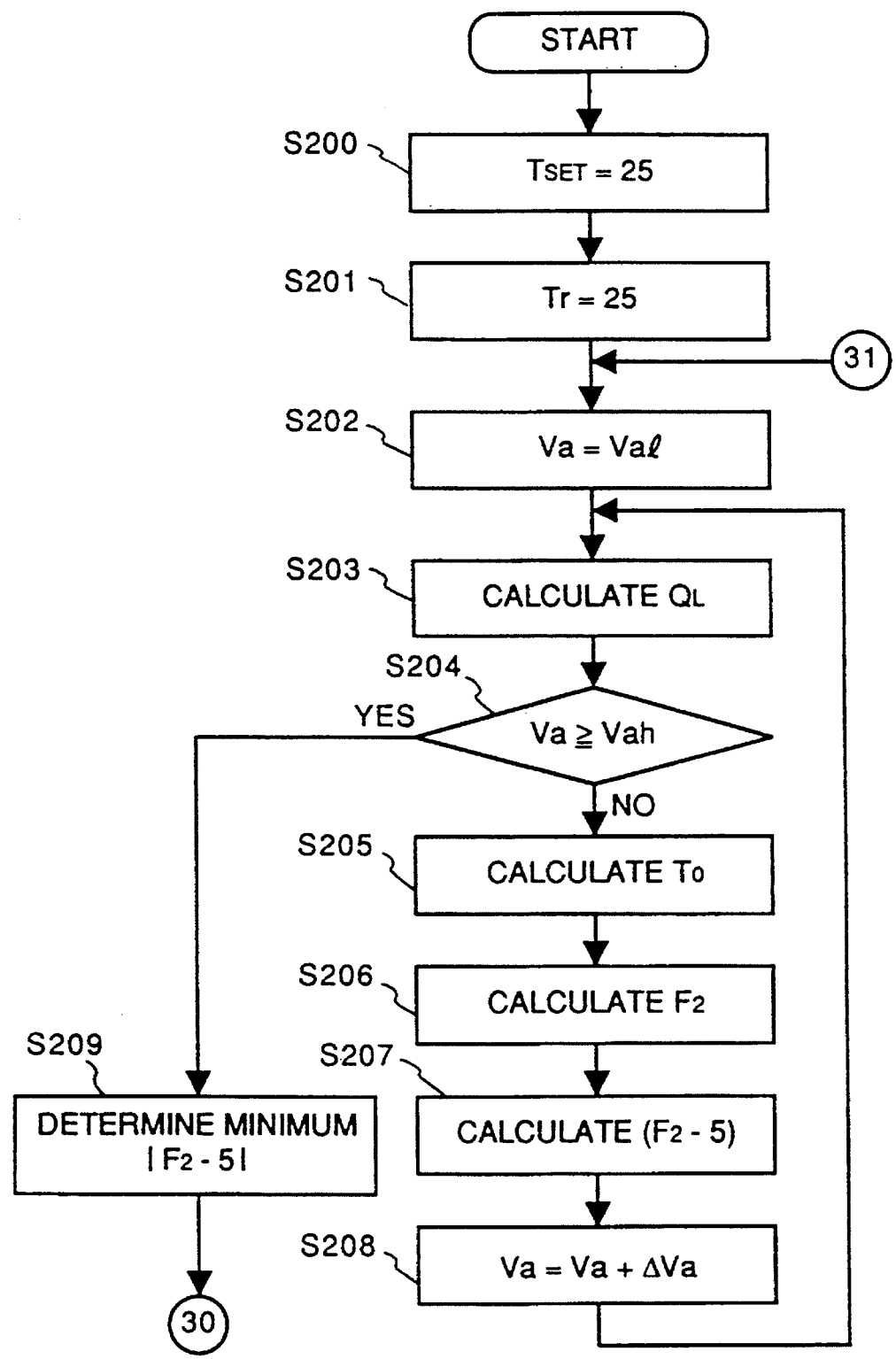
FIG. 15 is a flow chart showing details of a subroutine for calculating a target temperature, i.e., the control content for predicting a target temperature.
Figure 16:
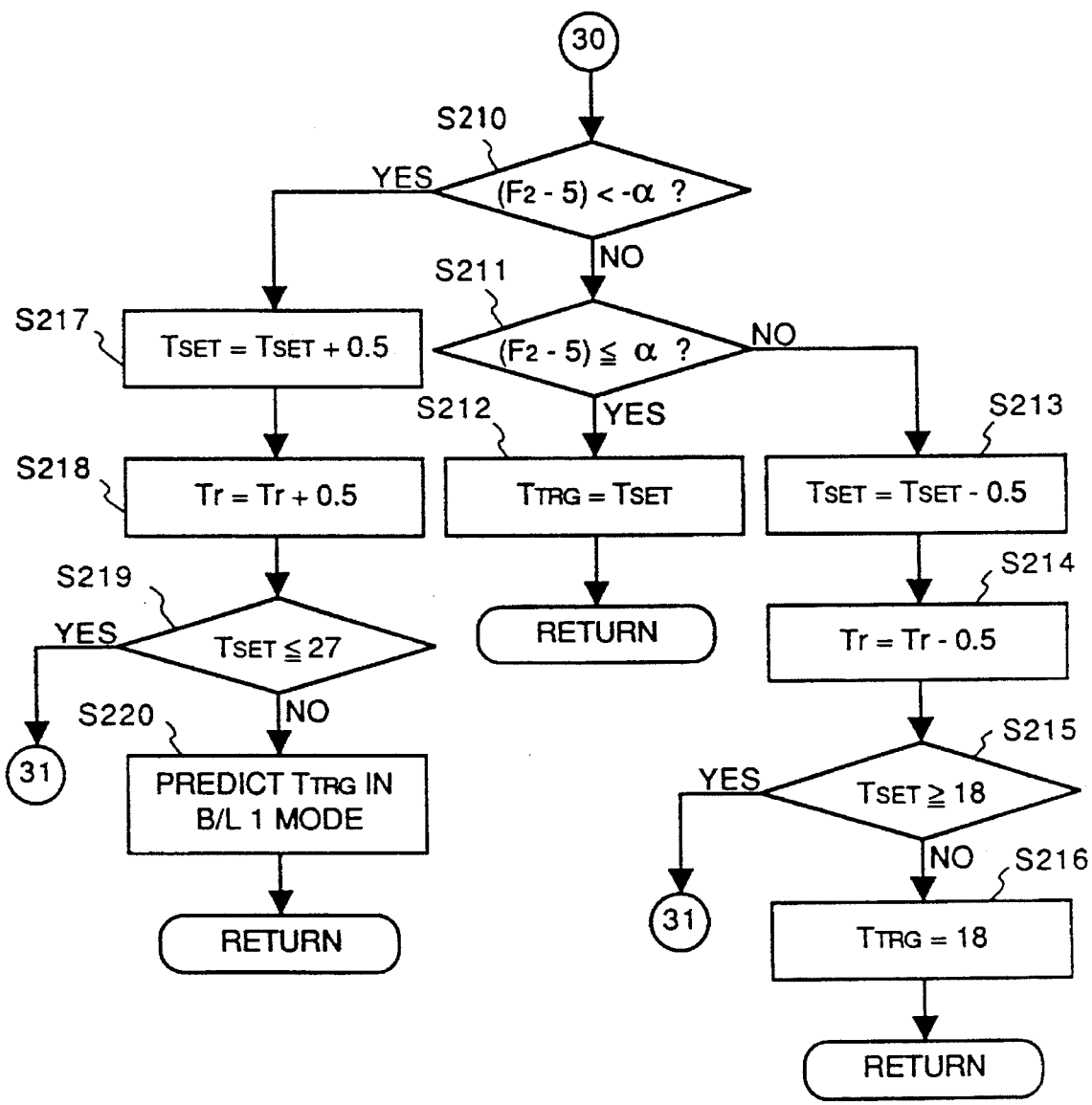
FIG. 16 is a flow chart showing the details of the subroutine for calculating a target temperature, i.e., the control content for predicting a target temperature together with FIG. 15.

FIGS. 15 and 16 show a subroutine showing the details of a calculation of the target temperature $T_{TRG}$ in step S12 (FIG. 4). In this subroutine, an optimal target temperature $T_{TRG}$ when an air-conditioned state reaches a stable period is predicted. More specifically, in step S200, the setting temperature $T_{SET}$ is set to be "25" since a comfortable setting temperature $T_{SET}$ is determined with reference to 25° C. The passenger room temperature $T_r$ becomes equal to the setting temperature $T_{SET}$ when a stable period is reached. For this reason, in step S201, the passenger room temperature $T_r$ is set to be "25" which is equal to the setting temperature $T_{SET}$. In steps S202 to S208, a combination of the outlet air flow rate $V_a$ and the outlet air temperature $T_o$ is searched on the basis of the value of the above-mentioned comfort index F (corresponding to, e.g., steps S14 to S24 in FIG. 4).

The outline of this search operation will be described below. In step S203, a vehicle heat load $Q_L$ is calculated on the basis of the equation in the stable period ($Q_L$=K·S($T_r$–$T_a$)–$K_s$·$T_s$–C). In this case, the passenger room temperature $T_r$ is not an actual room temperature, but a temperature set in, e.g., step S201. In step S206, a comfort index $F_2$ is calculated. In the calculation of the comfort index $F_2$, the passenger room temperature $T_r$ is not an actual room temperature, but a temperature set in, e.g., step S201. Therefore, the search operation of the combination of the outlet air flow rate $V_a$ and the outlet air temperature $T_o$ based on the value of the comfort index $F_2$ in steps S202 to S208 is performed independently of the current air-conditioned state under an assumption that the stable period has been reached (the passenger room temperature $T_r$ is equal to the setting temperature $T_{SET}$ (target temperature $T_{TRG}$)).

Upon completion of the search operation of the combination of the outlet air flow rate $V_a$ and the outlet air temperature $T_o$ based on the value $F_2$, the flow advances from step S204 to S209, and a combination having a comfort index $F_2$ closest to "5" is selected. In step S210, it is checked if the deviation ($F_2$–5) between the comfort index $F_2$ obtained by the selected combination of the outlet air flow rate $V_a$ and the outlet air temperature $T_o$, and "5" is smaller than a predetermined value ($-\alpha$). If NO in step S210, it is determined that the value $F_2$ is, e.g., equal to or larger than "4" and the flow advances to step S211 to check if the deviation ($F_2$–5) between the value $F_2$ and "5" is equal to or smaller than a predetermined value α. If YES in step S211, it is determined that the value $F_2$ is almost equal to "5", and the setting temperature $T_{SET}$ (25° C.) is set to be the target temperature $T_{TRG}$ in step S212.

If NO in step S211, it is determined that the value $F_2$ is equal to or larger than "6" and a state wherein a passenger feels hot is set. Thus, the flow advances to step S213, and the setting temperature $T_{SET}$ is decreased by a predetermined value. In step S214, the passenger room temperature $T_r$ is similarly decreased by the predetermined value. In step S215, it is checked if the setting temperature $T_{SET}$ is equal to or higher than "18° C.". If YES in step S215, the flow returns to step S202, and an optimal combination of the outlet air flow rate $V_a$ and the outlet air temperature $T_o$ is searched again on the basis of the changed setting temperature $T_{SET}$ and the changed passenger room temperature $T_r$. When a combination of the outlet air flow rate $V_a$ and the outlet air temperature $T_o$ having a value $F_2 \cong$ "5" can be found, the changed setting temperature $T_{SET}$ is set as the target temperature $T_{TRG}$ in step S212.

If YES in step S210, it is determined that the value $F_2$ is, e g , equal to or smaller than "4" and a state wherein a passenger feels cold is set. Thus, the flow advances to step S217, and the setting temperature $T_{SET}$ is increased by a predetermined value. In step S218, the passenger room temperature $T_r$ is similarly increased by the predetermined value. It is checked in step S219 if the setting temperature $T_{SET}$ is equal to or lower than "27° C.". If YES in step S219, the flow returns to step S202, and an optimal combination of the outlet air flow rate $V_a$ and the outlet air temperature $T_o$ is searched again on the basis of the changed setting temperature $T_{SET}$ and the changed passenger room temperature $T_r$. When a combination of the outlet air flow rate $V_a$ and the outlet air temperature $T_o$ having a value $F_2 \cong$ "5" can be found, the changed setting temperature $T_{SET}$ is set as the target temperature $T_{TRG}$ in step S212.

If NO in step S219, it is determined that an optimal combination of the outlet air flow rate $V_a$ and the outlet air temperature $T_o$ cannot be found in the ventilation mode, and the flow advances to step S220, and the target temperature $T_{TRG}$ in the B/L1 mode is predicted. The target temperature $T_{TRG}$ in the B/L1 mode is predicted by basically the same scheme as that in the ventilation mode although its flow chart is omitted. Of course, as described above (see FIGS. 6 and 7), the comfort index $F_2$ for the ventilation mode and the comfort index $F_4$ for the heating mode are used as the comfort index F. Also, the maps shown in FIGS. 17 and 20 are used. When an optimal combination of the outlet air flow rate $V_a$ and the outlet air temperature $T_o$ cannot be found in the B/L1 mode, the target temperature $T_{TRG}$ is similarly predicted in the B/L2 mode, B/L3 mode, and heating mode.

In this manner, since the target temperature $T_{TRG}$ is predicted in step S12 shown in FIG. 4 assuming a stable period, the outlet air flow rate $V_a$, and the like set in, e.g., step S30 (FIG. 4) in an unstable period are based on the predicted target temperature $T_{TRG}$. When the air-conditioned state actually enters a stable period, the predicted target temperature $T_{TRG}$ is directly used, and air-conditioning control based on this target temperature $T_{TRG}$ is executed. Therefore, since the control is made in an unstable period based on the target temperature $T_{TRG}$ in a future stable period from the beginning, the air-conditioned state can reach the stable period earlier than that in a case wherein such prediction is not performed.

Upon setting of the outlet air flow rate and the outlet air temperature based on the heat balance equation in air-conditioning control, a combination of the outlet air flow rate and the outlet air temperature, which has a comfort index F close to "value F=5" is set, and in addition, an outlet mode is set based on the comfort index F. Since the comfort index F includes parameters which influence the comfort level actually felt by a passenger, a combination desirable for comfort of a passenger can be systematically set on the basis of the comfort index F.

When the air-conditioned state actually reaches a stable period, the target temperature $T_{TRG}$ is adjusted, so that the comfort index F becomes closer to "value F=5". Thus, a combination of the outlet air flow rate and the outlet air temperature, which can more satisfactorily improve the comfort of a passenger, can be set.

As can be seen from the above description, according to the first embodiment, since air-conditioning control in an unstable period is executed on the basis of a target temperature, which is predicted based on a comfort index in a future stable period, the air-conditioned state can enter the stable period early.

(Second Embodiment)

The control content of the first embodiment described above is applied as long as a vehicle is operating. However, the control content of the second embodiment is applied to a short period of time immediately after the engine of a vehicle is started.

In the second embodiment, the arrangement of a vehicle air-conditioner is the same as that of the first embodiment shown in FIGS. 1 and 2, and the control content of the control circuit 22 is the principal characteristic feature of the second embodiment. Therefore, a description about the arrangement of the vehicle air conditioner will be omitted here.

The content of air-conditioning control of the second embodiment premised on a cooling operation will be described hereinafter. The outline of the control will be described below. After the operation of the compressor 15 is started when the air-conditioning switch (auto switch 23a) is turned on, an outlet start timing of air-conditioning air is determined upon comparison between a comfort index $F_1$ and a discomfort index $F_o$ (to be described later). More specifically, only after an air-conditioned state that does not worsen the discomfort level felt by a passenger when the air-conditioning switch 23a is turned on can be realized, the outlet operation of air-conditioning air (the operation of the blower 11) is started. Discrimination of this state uses the following comfort index $F_1$ and discomfort index $F_o$.

The comfort index $F_1$ will be described below. The comfort index $F_1$ is defined by the following equation:

$$F_1 = K_1 \cdot V + K_2 \cdot T_e + K_3 \cdot T_r + K_4 \cdot T_a + K_5 \cdot T_s + C_1$$

where

V: outlet air flow rate $T_e$: evaporator temperature $T_r$: passenger room temperature $T_a$: atmospheric temperature $T_s$: solar radiation amount $C_1$: constant In the $F_1$ equation, $K_1$ to $K_5$ are weighting coefficients, and these coefficients $K_1$ to $K_5$ are experimentally obtained. More specifically, the comfort index $F_1$ is obtained by converting a comfort level felt by a passenger into an index on the basis of various parameters that influence the comfort of the passenger. In this case, the coefficients $K_1$ to $K_5$ are set so that the most comfortable state corresponds to $F_1=5$. Therefore, as the index $F_1$ deviates further from $F_1=5$, the discomfort level felt by a passenger increases. For example, when the value of the comfort index $F_1$ is considerably larger than "5", this means, as an example of discomfort, a state wherein a passenger feels hot.

On the other hand, the discomfort index $F_o$ will be described below. The discomfort index $F_o$ is defined by the following equation:

$$F_o = K_6 \cdot T_e + K_7 \cdot T_r + K_s \cdot T_a + K_9 \cdot T_s + C_2$$

where $C_2$ is a constant.

In the $F_o$ equation, $K_5$ to $K_9$ are weighting coefficients, and these coefficients are experimentally obtained. More specifically, the discomfort index $F_o$ is obtained by converting a discomfort level felt by a passenger into an index on the basis of various parameters that influence the comfort of the passenger like in the comfort index $F_1$. In this case, the coefficients $K_5$ to $K_9$ are set, so that the least discomfort level state corresponds to "$F_o=5$". In other words, the same comfort level state as the comfort level of "$F_1=5$" corresponds to "$F_o=5$". Therefore, as the discomfort index $F_o$ deviates further from "$F_o=5$" this means that the discomfort level felt by a passenger increases. For example, when the value of the discomfort index $F_o$ is considerably larger than "5" this means, as an example of discomfort, a state wherein a passenger feels hot.

The functions of the comfort index $F_1$ and the discomfort index $F_o$ will be described in detail below. The comfort index $F_1$ represents a comfort level, which will be felt by a passenger assuming that air-conditioning air is output after the air-conditioning switch is turned on. The comfort index $F_1$ is sequentially updated. On the other hand, the discomfort index $F_o$ represents a discomfort level in a passenger room when the air-conditioning switch is turned on. For example, the discomfort index $F_o$ represents a discomfort level when a passenger gets in a vehicle under the blazing sun, and starts an engine.

When the comfort index $F_1$ is larger than the discomfort index $F_o$, the operation of the blower 11 is inhibited, and hence, the outlet operation of air-conditioning air is inhibited. When the comfort index $F_1$ becomes equal to or smaller than the discomfort index $F_o$ along with an elapse of time, the operation of the blower 11 is started, and air-conditioning air is output.

Figure 23:
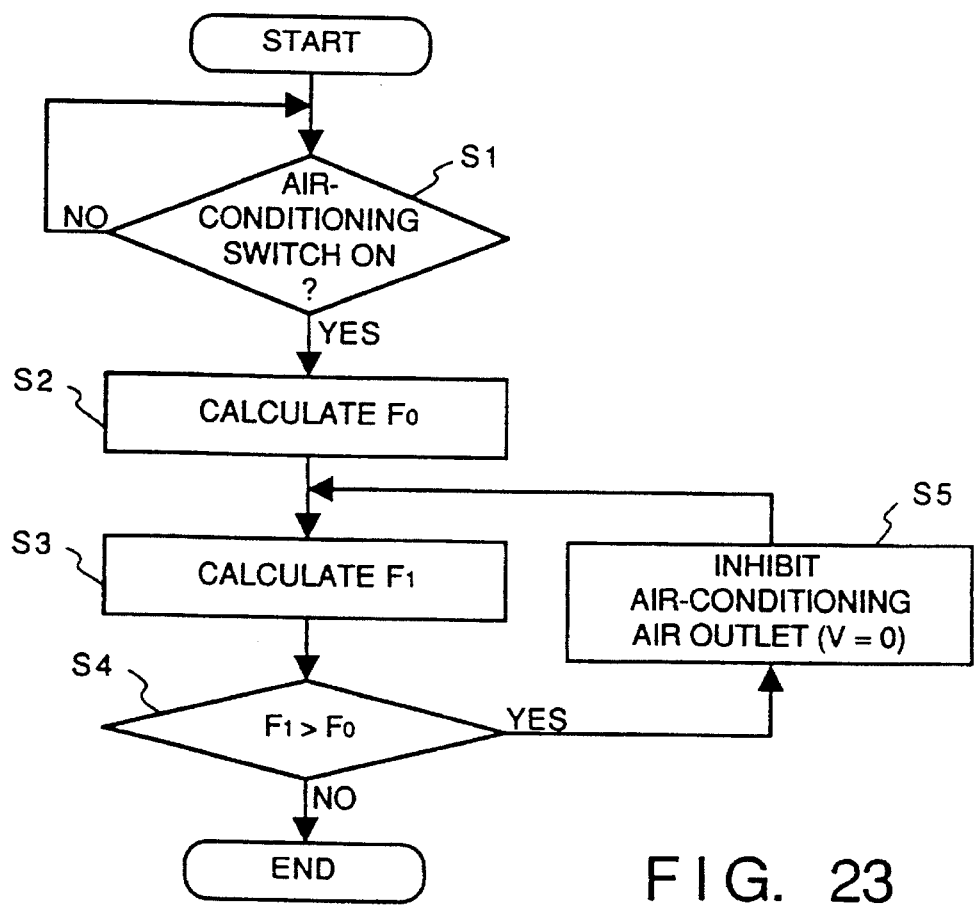
FIG. 23 is a flow chart showing an example of air-conditioning air outlet control in a cooling operation.
Figure 24:
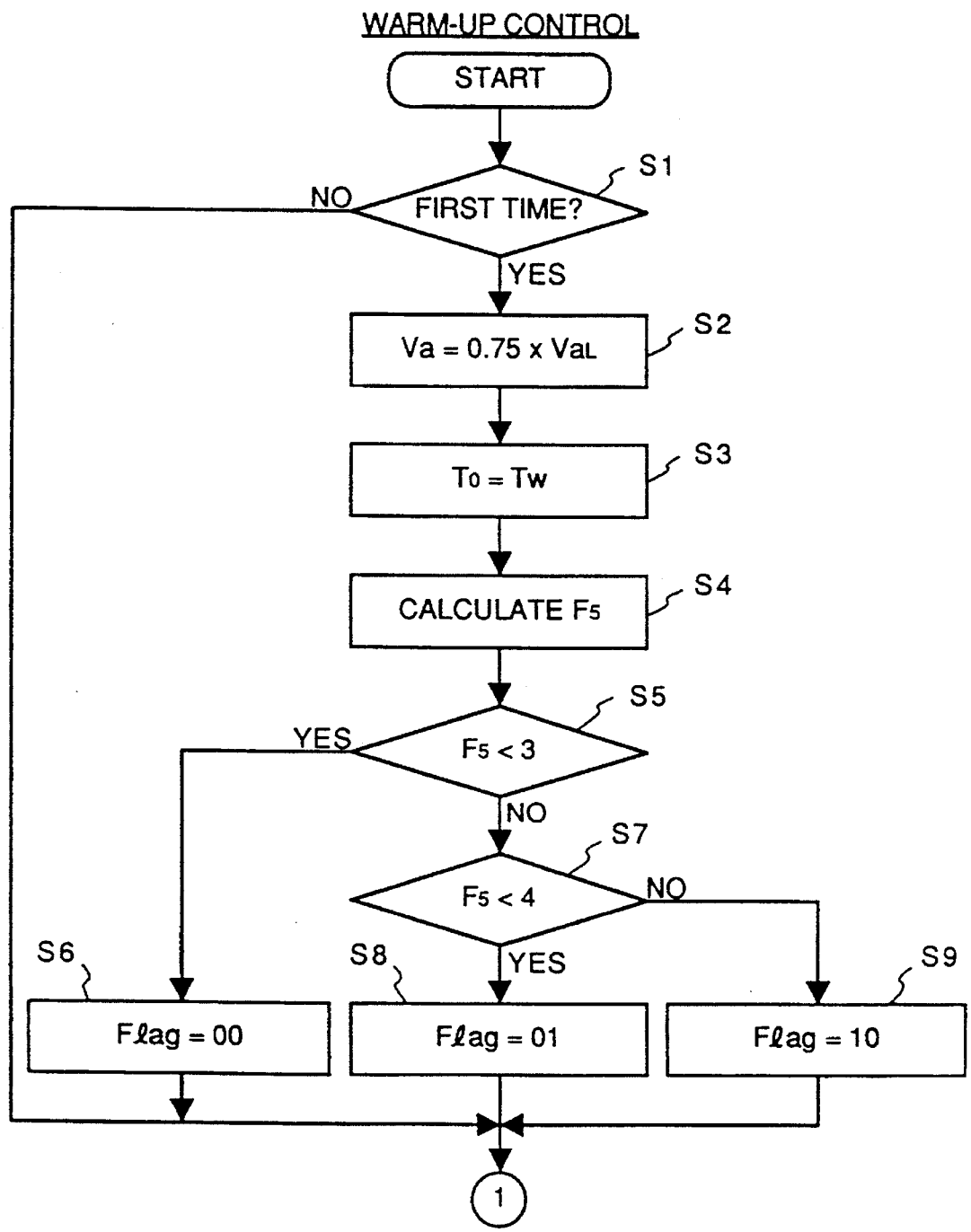
FIG. 24 is a flow chart showing an example of warm-up control.

This operation will be described in detail below with reference to the flow chart shown in FIG. 23.

In step S1, it is checked if the air-conditioning switch is turned on. If YES in step S1, the flow advances to step S2 to calculate a discomfort index $F_o$. In addition, the calculated value of the discomfort index $F_o$ is stored in a memory (RAM). Upon calculation of the discomfort index $F_o$, the evaporator temperature $T_e$ indicates the temperature of air staying in the duct 1 since the compressor 15 is just started.

In step S3, the comfort index $F_1$ is calculated. The outlet air flow rate V necessary for calculating the comfort index $F_1$ will be explained below. When a minimum outlet air flow rate $V_{LOW}$ (gentle air state) is set as the air flow rate at the beginning of the air outlet operation, as will be described later, the comfort index $F_1$ is calculated using the minimum outlet air flow rate $V_{LOW}$ as the outlet air flow rate V. For example, when a vehicle is parked under the blazing sun, the temperature of air staying in the duct 1 becomes high. Thus, when the high-temperature air is blown to a passenger, he or she feels very uncomfortable. That is, the value of the comfort index $F_1$ is larger than the discomfort index $F_o$ when a passenger gets in a vehicle.

In step S4, it is checked if the comfort index $F_1$ is larger than the discomfort index $F_o$. If YES in step S4 ($F_1 > F_o$), it is determined that a passenger feels more uncomfortable if air-conditioning air is output (the blower 11 is started). Thus, the flow advances to step S5 to inhibit the blower 11 from being started (to inhibit air-conditioning air from being output). Thereafter, the flow returns to step S3, and the comfort index $F_1$ is calculated again.

As time elapses, the evaporator temperature $T_e$ is decreased, and the comfort index $F_1$ then becomes equal to or lower than the discomfort index $F_o$. That is, when a state wherein the discomfort level currently felt by a passenger is not worsened any more even when air-conditioning air is output (the blower 11 is started) is determined, control for delaying the start timing of the blower 11 is ended.

With the above-mentioned control, when the outlet operation of air-conditioning air is started, the discomfort level felt by a passenger can be at least prevented from being worsened by starting the outlet operation of air-conditioning air. When the value of the discomfort index $F_o$ when a passenger gets in a vehicle is not so large, i.e., when the value of the discomfort index $F_o$ is close to $F_o = 5$, the outlet operation of air-conditioning air is started at an early timing. In other words, the outlet timing of air-conditioning air is automatically adjusted according to the discomfort index $F_o$.

Thereafter, the blower 11 is started, and a cooling operation is actually executed. At the beginning of this cooling control, it is preferable to set the outlet air flow rate V to be the minimum outlet air flow rate $V_{LOW}$, and to gradually increase the outlet air flow rate V. The increase in outlet air flow rate V can be easily attained by utilizing, e.g., a timer. As the discomfort index $F_o$ indicates a larger value, the rate of increase in outlet air flow rate V may be increased to perform a quick cooling operation. More specifically, whether or not the quick cooling operation is necessary can be determined according to the value of the discomfort index $F_o$. In addition, the degree of the quick cooling operation can be changed according to the value of the discomfort index $F_o$.

As the outlet mode, the outlet operation may be started from the defroster outlet ports 7, or may be started from the ventilation outlet port 5. Of course, when the outlet operation of air-conditioning air is started from the defroster outlet ports 7, the coefficients $K_1$ to $K_5$ in the $F_1$ equation are set under an assumption that air-conditioning air is output from the defroster outlet ports 7. On the other hand, when the outlet operation of air-conditioning air is started from the ventilation outlet port 5, the coefficients $K_1$ to $K_5$ in the $F_1$ equation are set under an assumption that air-conditioning air is output from the ventilation outlet port 5.

As can be apparent from the above description, according to the second embodiment, the outlet timing of air-conditioning air can be automatically adjusted according to the discomfort level at the beginning of the cooling operation without increasing the discomfort level felt by a passenger at the beginning of the cooling operation.

(Third Embodiment)

The control content of the first embodiment described above is applied as long as a vehicle is operating. However, the control content of the second embodiment is applied to a short period of time immediately after the engine of a vehicle is started like in the second embodiment.

In the third embodiment, the arrangement of a vehicle air-conditioner is the same as that of the first embodiment shown in FIGS. 1 and 2, and the control content of the control circuit 22 is the principal characteristic feature of the third embodiment. Therefore, a description about the arrangement of the vehicle air conditioner will be omitted here.

Heating control in a warm-up operation (warm-up control) of the air-conditioning control executed by the control circuit 22 will be described hereinafter.

The outline of the warm-up control will be explained below. Selection of an outlet air flow rate and an outlet air temperature, and mode control are made with reference to a comfort index $F_5$.

The comfort index $F_5$ will be described below. The comfort index $F_5$ is defined by the following equation.

$$F_5 = -K_1 \cdot V_a + K_2 \cdot T_o + K_3 \cdot T_r + K_4 \cdot T_a + C_1$$

where $V_a$: outlet air flow rate
$T_o$: outlet air temperature
$T_r$: passenger room temperature
$T_a$: atmospheric temperature In addition, in the $F_5$ equation, $C_1$ is a constant, and $K_1$ to $K_4$ are weighting coefficients. The constant $C_1$ and the coefficients $K_1$ to $K_4$ are experimentally obtained. More specifically, the comfort index $F_5$ is obtained by converting a comfort level felt by a passenger in a heating operation during a warm-up operation into an index. In this case, the constant $C_1$ and the coefficients $K_1$ to $K_4$ are set, so that the most comfortable state corresponds to "$F_5=5$". Therefore, as the comfort index $F_5$ deviates further from "$F_5=5$", the discomfort level is increased. For example, when the outlet air temperature $T_o$ is constant, if the outlet air flow rate $V_a$ is increased, a passenger feels cold. At this time, the value $F_5$ is smaller than "5".

Warm-up control premised on the above description will be described in detail below with reference to the flow charts shown in FIGS. 24 to 27.

In step S1, it is checked if the control is made for the first time. If YES in step S1, the flow advances to step S2, and the flow rate of air to be output from the foot outlet port 6 when the minimum air flow rate $V_{aL}$ is set is calculated based on an equation $V_a = 0.75 \times V_a$.

More specifically, when the foot outlet port 6 is selected as the outlet port of air-conditioning air, i.e., when the heating mode is selected, air is output from the foot outlet port 6 at a flow rate 75% of the flow rate $V_a$ of air supplied from the ventilation duct 1, and air is output from the defroster outlet ports 7 at a flow rate 25% of the flow rate $V_a$.

In step S3, an engine cooling water temperature $T_w$ is set as an outlet air temperature $T_o$. In step S4, the comfort index $F_5$ is calculated based on these values.

In step S5, it is checked if the value of the comfort index $F_5$ is smaller than "3". If YES in step S5, it is determined that the current cooling water temperature $T_w$ is considerably low. Thus, the flow advances to step S6 to set a flag "00". On the other hand, if NO in step S5, the flow advances to step S7 to check if the value of the comfort index $F_5$ is smaller than "4". If YES in step S7, it is determined that the cooling water temperature $T_w$ is in a medium state. Thus, the flow advances to step S8 to set a flag "01". However, if NO in step S7, it is determined that the cooling water temperature $T_w$ is considerably high. Thus, the flow advances to step S9 to set a flag "10".

Figure 25:
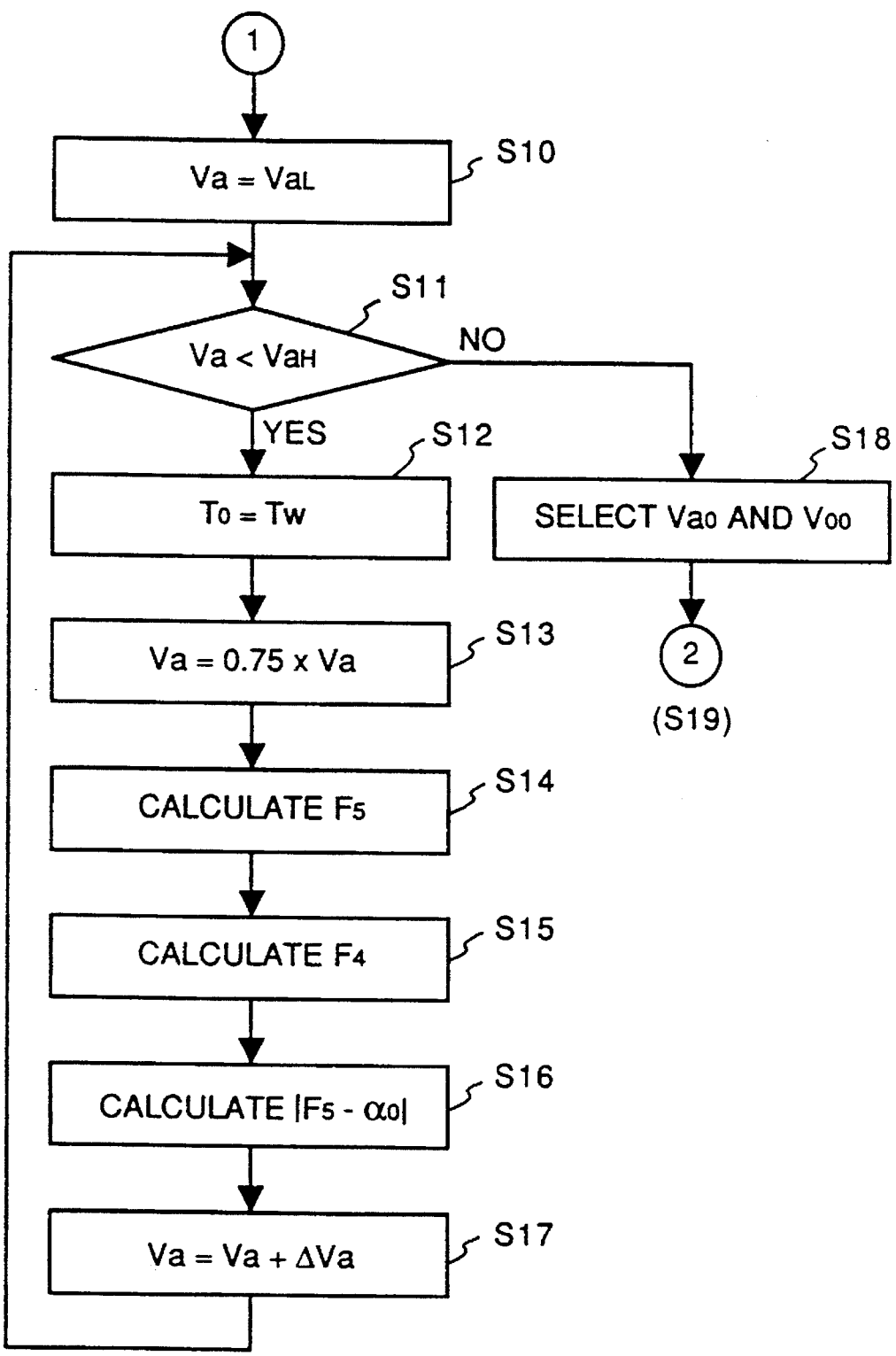
FIG. 25 is a flow chart showing the warm-up control together with FIG. 24.
Figure 26:
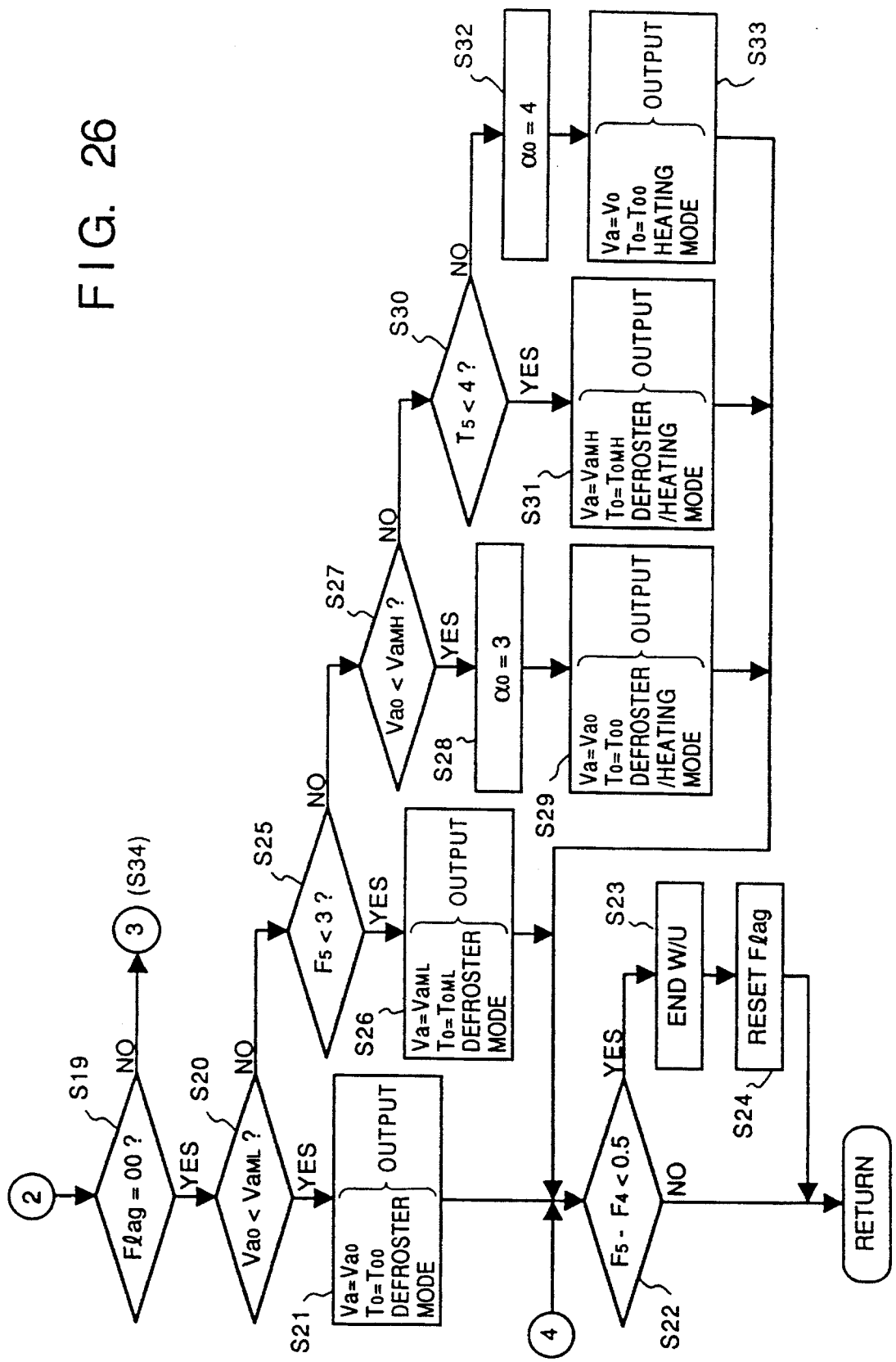
FIG. 26 is a flow chart showing the warm-up control together with FIGS. 24 and 25.
Figure 27:
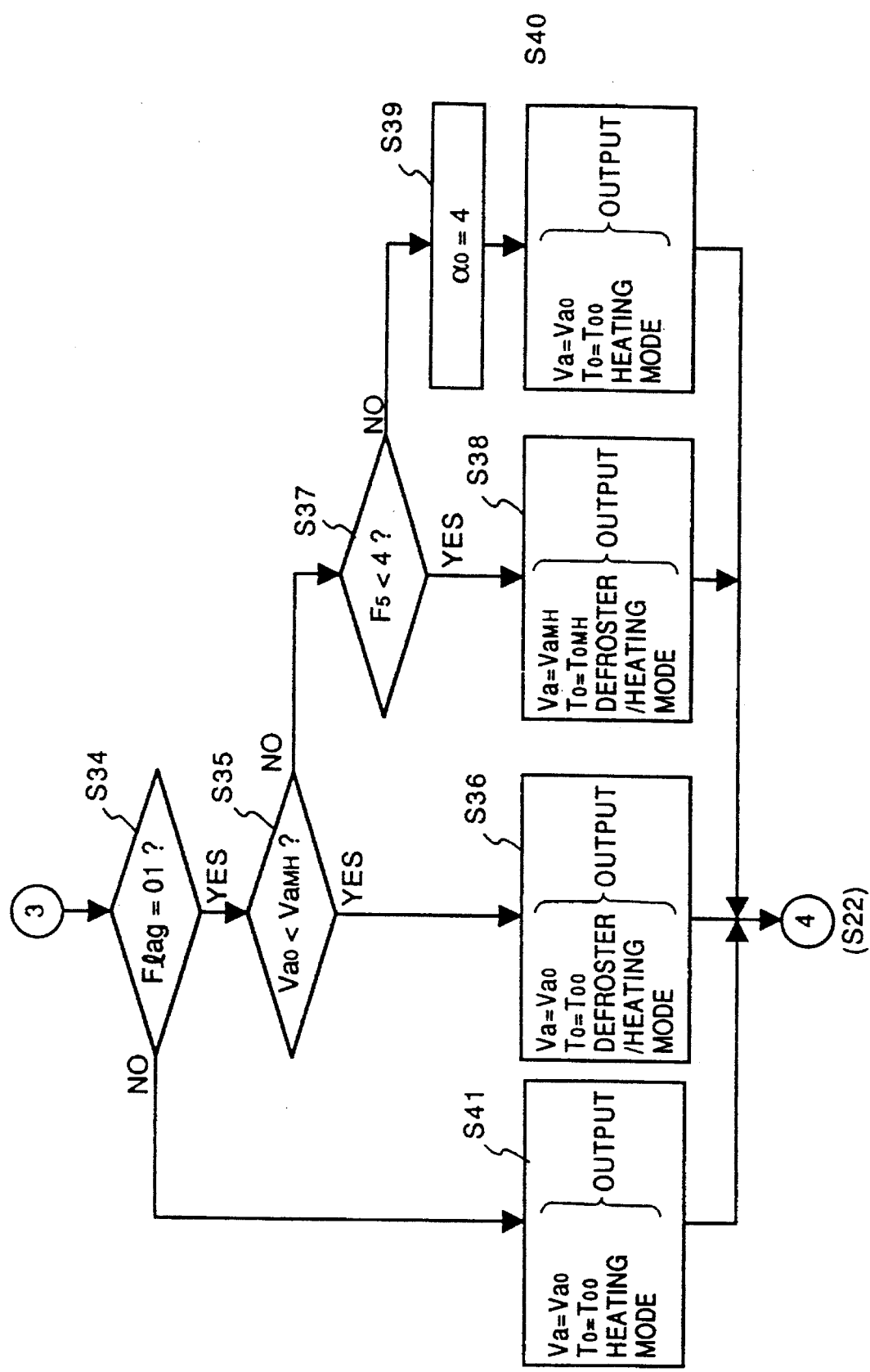
FIG. 27 is a flow chart showing the warm-up control together with FIGS. 24, 25, and 26.

In steps S10 to S17 shown in FIG. 25, a combination of the outlet air flow rate $V_a$ and the outlet air temperature $T_o$ is searched. The content of this search operation will be explained below.

More specifically, in step S10, the outlet air flow rate $V_a$ is set to be the minimum air flow rate $V_{aL}$. Thereafter, the outlet air temperature $T_o$ is set to be the engine cooling water temperature $T_w$ in step S12 via step S11 (to be described later). In step S13, the outlet air flow rate $V_a$ is converted into an outlet air flow rate of air to be output from the foot outlet port 6. Based on these values, a comfort index $F_5$ for the warm-up control is then calculated. In step S15, a comfort index $F_4$ upon completion of the warm-up operation is calculated. The comfort index $F_4$ will be described below. The comfort index $F_4$ is defined by the following equation:

$$F_4 = K_5 \cdot V_a - K_6 \cdot T_o + K_7 \cdot T_r + K_8 \cdot T_a + C_2$$

Note that the meanings of $V_a$ and the like are the same as those in the above equation associated with $F_5$, and will be explained again.

$V_a$: outlet air flow rate
$T_o$: outlet air temperature
$T_r$: passenger room temperature
$T_a$: atmospheric temperature In the $F_4$ equation, $C_2$ is a constant, and $K_5$ to $K_8$ are weighting coefficients. The constants $C_2$ and the coefficients $K_5$ to $K_8$ are experimentally obtained. More specifically, the comfort index $F_4$ is obtained by converting a comfort level felt by a passenger in a heating operation upon completion of the warm-up operation into an index. That is, the constants $C_2$ and the coefficients $K_5$ to $K_8$ are set on the basis of the heated air-conditioning air output from the foot outlet port 6 upon completion of the warm-up operation, so that the most comfortable state corresponds to "$F_4=5$". For example, when the value $F_4$ is smaller than "5", this means a state wherein a passenger feels cold. Note that the comfort felt by a passenger when $F_4=5$ is set to be the same as that felt by a passenger when $F_5=5$.

In step S16, the absolute value of a deviation between the warm-up comfort index $F_5$ and a predetermined value $\alpha_o$ is calculated. The predetermined value $\alpha_o$ is set to be an initial value $\alpha_o=2$. In step S17, the outlet air flow rate $V_a$ is increased by a predetermined amount $\Delta V_a$. The above-mentioned processing in steps S13 to S16 is repeated until a maximum air flow rate $V_{aH}$ is reached. With this series of processing operations, after the engine cooling water temperature $T_w$ is set as the outlet air temperature $T_o$, the outlet air flow rates $V_a$, which are increased stepwise from the minimum air flow rate $V_{aL}$ to the maximum air flow rate $V_{aH}$, and pairs of comfort indices $F_4$ and $F_5$ obtained based on combinations of the outlet air temperatures $T_o$ and the outlet air flow rates $V_a$ are obtained.

If NO is determined in step S11, it is determined that the search operation is performed up to the maximum air flow rate $V_{aH}$, and the flow advances to step S18. An outlet air flow rate selected in step S18 based on the absolute value of $(F_5-\alpha_o)$ in step S16 is represented by "$V_{ao}$", and an outlet air temperature selected in step S18 is represented by "$T_{oo}$".

In step S19, it is checked if the flag is "00". If YES in step S19, the flow advances to step S20 to check if the selected outlet air flow rate $V_{ao}$ is lower than a "medium low air flow rate $V_{aML}$" as a predetermined value. If YES in step S20, the selected outlet air flow rate $V_{ao}$ and outlet air temperature $T_{oo}$, and a defroster mode are output. More specifically, when the engine cooling water temperature $T_w$ is low, the outlet air flow rate $V_{ao}$ having the comfort index $F_5=$"2" is set, and the defroster outlet ports 7 are selected as the outlet port.

In step S22, it is checked if the difference between the values $F_5$ and $F_4$ is smaller than "0.5". If NO in step S22, it is too early to start heating control after the completion of the warm-up operation. The flow then returns to step S10 to search a combination of the outlet air flow rate $V_a$ and the outlet air temperature $T_o$ again, thereby selecting a combination of the outlet air flow rate $V_{ao}$ and the outlet air temperature $T_{oo}$ closest to $F_5=2$ (S18).

Since the engine cooling water temperature $T_w$ is increased along with an elapse of time, the selected outlet air flow rate $V_{ao}$ is gradually increased. If NO is determined in step S20 via step S19, the flow advances to step S25 to check if the value of the comfort index $F_5$ serving as a reference for selecting the outlet air flow rate $V_{ao}$, and the like in step S18 is smaller than "3". If YES in step S25, the flow advances to step S26 to set the outlet air flow rate to be a "medium low air flow rate $V_{aML}$" as a predetermined value, and to set the outlet air temperature to be a "medium low temperature $T_{oML}$" as a predetermined value. In addition, as an outlet mode, the defroster mode is set.

More specifically, when the engine cooling water temperature $T_w$ is increased along with an elapse of time, and the comfort index $F_5$ is gradually increased but does not reach "3" the outlet air flow rate and the outlet air temperature are controlled to have the predetermined values ($V_{aML}$ and $T_{oML}$) in the defroster mode.

Thereafter, when the value of the comfort index $F_5$ becomes equal to or larger than "3" along with an elapse of time, the flow advances from step S25 to step S27 to check if the selected outlet air flow rate $V_{ao}$ is lower than a "medium high air flow rate $V_{aMH}$" as a predetermined value. If YES in step S27, the predetermined value $\alpha_o$ is changed to "$\alpha_o=3$" in step S28, and thereafter, the outlet air flow rate $V_{ao}$ and the outlet air temperature $T_{oo}$ selected in step S18, and a defroster/heating mode are set and output in step S29.

In the defroster/heating mode, air-conditioning air is output from both the defroster outlet ports 7 and the foot outlet port 6. Since $\alpha_o$ is changed to "3" in step S28, the subsequent calculation of the absolute value ($F_5-\alpha_o$) in step S16 is performed using $\alpha_o=3$. In step S18, a combination of the outlet air flow rate $V_{ao}$ and the outlet air temperature $T_{oo}$, which has a minimum absolute value of ($F_5-3$), is selected.

Thereafter, when the selected outlet air flow rate $V_{ao}$ becomes equal to or higher than the "medium high air flow rate $V_{aMH}$" as the predetermined value since the cooling water temperature $T_w$ is increased along with an elapse of time, the flow advances from step S27 to step S30 to check if the value of the comfort index $F_5$ serving as a reference for selecting the outlet air flow rate $V_{ao}$, and the like in step S18 is smaller than "4". If YES in step S30, the flow advances to step S31. In step S31, the outlet air flow rate is set to be the "medium high air flow rate $V_{aMH}$" as the predetermined value, the outlet air temperature is set to be a "medium high temperature $T_{oMH}$" as a predetermined value, and the defroster/heating mode is set as the outlet mode.

Thus, when the engine cooling water temperature $T_w$ is increased along with an elapse of time, and the comfort index $F_5$ is gradually increased but does not reach "4", the outlet air flow rate and the outlet air temperature are controlled to have the predetermined values ($V_{aMH}$ and $T_{oMH}$) in the defroster/heating mode.

Thereafter, when the value of the comfort index $F_5$ becomes equal to or larger than "4" along with an elapse of time, the flow advances from step S30 to step S32 to change the predetermined value $\alpha_o$ to "$\alpha_o=4$". In step S33, the outlet air flow rate $V_{ao}$ and the outlet air temperature $T_{oo}$ selected in step S18, and the heating mode are set and output.

Since $\alpha_o$ is changed to "4" in step S32, the subsequent calculation of the absolute value ($F_5-\alpha_o$) in step S16 is performed using $\alpha_o=4$. In step S18, a combination of the outlet air flow rate $V_{ao}$ and the outlet air temperature $T_{oo}$, which has a minimum absolute value of ($F_5-4$), is selected.

Thereafter, when the value of the warm-up comfort index $F_5$ is increased, and the value ($F_5-F_4$) becomes smaller than "0.5", the flow advances from step S22 to S23 to end the above-mentioned warm-up control, and in step S24, the flag is reset.

On the other hand, when the flag "01" is set, it is determined that the engine cooling water temperature $T_w$ at the beginning of the warm-up control is medium, and the flow advances from step S34 (FIG. 27) to step S35 to check if the outlet air flow rate $V_{ao}$ selected in step S18 is lower than the "medium high air flow rate $V_{aMH}$" as the predetermined value. If YES in step S35, the flow advances to step S36, and the outlet air flow rate $V_{ao}$ and the outlet air temperature $T_{oo}$ selected in step S18, and the defroster/heating mode are set and output.

Thereafter, when the selected outlet air flow rate $V_{ao}$ becomes equal to or higher than the "medium high air flow rate $V_{aMH}$" as the predetermined value since the cooling water temperature $T_w$ is increased along with an elapse of time, the flow advances from step S35 to step S37 to check if the value of the comfort index $F_5$ serving as a reference for selecting the outlet air flow rate $V_{ao}$, and the like in step S18 is smaller than "4". If YES in step S37, the flow advances to step S38. In step S38, the outlet air flow rate is set to be the "medium high air flow rate $V_{aMH}$" as the predetermined value, the outlet air temperature is set to be a "medium high temperature $T_{oMH}$" as a predetermined value, and the defroster/heating mode is set as the outlet mode.

Thus, when the engine cooling water temperature $T_w$ is increased along with an elapse of time, and the comfort index $F_5$ is gradually increased but does not reach "4", the outlet air flow rate and the outlet air temperature are controlled to have the predetermined values ($V_{aMH}$ and $T_{oMH}$) in the defroster/heating mode.

Thereafter, when the value of the comfort index $F_5$ becomes equal to or larger than "4" along with an elapse of time, the flow advances from step S37 to step S39 to change the predetermined value $\alpha_o$ to "$\alpha_o=4$". In step S40, the outlet air flow rate $V_{ao}$ and the outlet air temperature $T_{oo}$ selected in step S18, and the heating mode are set and output. Since $\alpha_o$ is changed to "4" in step S39, the subsequent calculation of the absolute value ($F_5-\alpha_o$) in step S16 is performed using $\alpha_o=4$. In step S18, a combination of the outlet air flow rate $V_{ao}$ and the outlet air temperature $T_{oo}$, which has a minimum absolute value of ($F_5-4$), is selected.

Thereafter, when the value of the warm-up comfort index $F_5$ is increased, and the value ($F_5-F_4$) becomes smaller than "0.5", the flow advances from step S22 to S23 to end the above-mentioned warm-up control, and in step S24, the flag is reset.

On the other hand, when the flag "10" is set, it is determined that the engine cooling water temperature $T_w$ at the beginning of the warm-up control is considerably high, and the flow advances from step S34 (FIG. 27) to step S41. In step S41, the outlet air flow rate $V_{ao}$ and the outlet air temperature $T_{oo}$ selected in step S18, and the heating mode are set and output. When the value ($F_5-F_4$) becomes smaller than "0.5" along with an elapse of time, the flow advances to step S22 to end the warm-up control.

The above-mentioned control contents can be illustrated as graphs shown in FIGS. 28 to 31.

Figure 28:
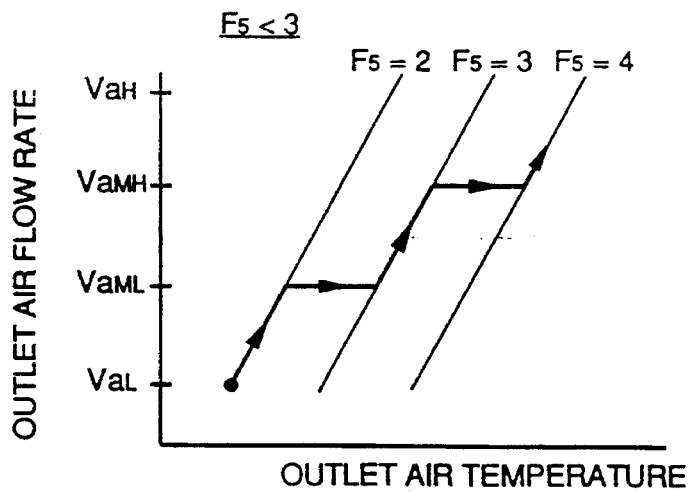
FIG. 28 is a control characteristic graph showing a control content when a comfort index $F_5$ is small at the beginning of warm-up control (e.g., when the passenger room temperature is low)

More specifically, when the engine cooling water temperature $T_w$ at the beginning of the warm-up control is low (when flag="00"), as shown in FIG. 28, air-conditioning control is performed under a condition that the comfort index $F_5=2$. When the outlet air flow rate reaches the "medium low air flow rate $V_{aML}$", the outlet temperature is increased toward the index $F_5=3$ in the state of the "medium low air flow rate $V_{aML}$".

After the comfort index $F_5$ becomes "3", air-conditioning control is performed under a condition that the index $F_5=3$. When the outlet air flow rate reaches the "medium high air flow rate $V_{aMH}$", the outlet temperature is increased toward the index $F_5=4$ in the state of the "medium high air flow rate $V_{aMH}$". After the comfort index $F_5$ becomes "4" air-conditioning control is performed under a condition that the index $F_5=4$.

Figure 29:
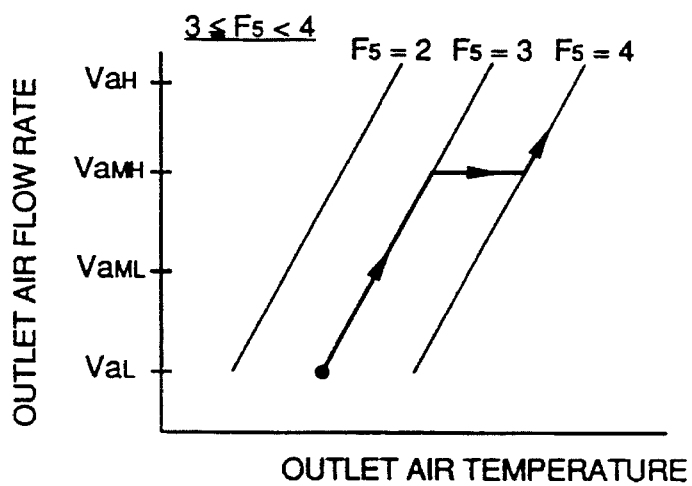
FIG. 29 is a control characteristic graph showing a control content when the comfort index $F_5$ is relatively large at the beginning of warm-up control (e.g., when the passenger room temperature is relatively high)

On the other hand, when the engine cooling water temperature $T_w$ at the beginning of the warm-up control is medium (when flag="01"), as shown in FIG. 29, air-conditioning control is performed under a condition that the comfort index $F_5=3$. When the outlet air flow rate reaches the "medium high air flow rate $V_{aMH}$", the outlet temperature is increased toward the index $F_5=4$ in the state of the "medium high air flow rate $V_{aMH}$". After the comfort index $F_5$ becomes "4", air-conditioning control is performed under a condition that the index $F_5=4$.

Figure 30:
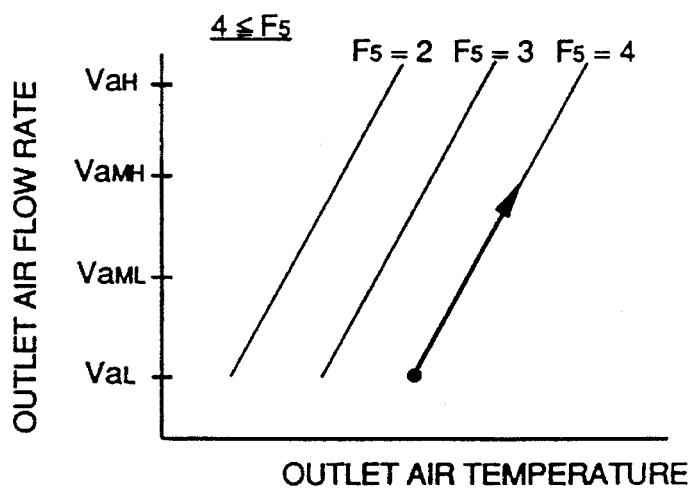
FIG. 30 is a control-characteristic graph showing a control content when the comfort index $F_5$ is considerably large at the beginning of warm-up control (e.g., when the passenger room temperature is considerably high)

When the engine cooling water temperature $T_w$ at the beginning of the warm-up control is considerably high (when flag ="10"), as shown in FIG. 30, air-conditioning control is performed under a condition that the comfort index $F_5=4$.

In the above-mentioned warm-up control, since the outlet air flow rate, and the like are controlled on the basis of the comfort index $F_5$ including the passenger room temperature $T_r$ as a parameter, for example, when the passenger room temperature $T_r$ is low, the rate of increase in air flow rate is decreased as compared to a case wherein the passenger room temperature $T_r$ is high. More specifically, when the passenger room temperature $T_r$ is low, a passenger should feel cold regardless of the engine cooling water temperature, and the comfort index $F_5$ representing this state has a small value such as "2". That is, as long as the passenger room temperature $T_r$ is low, the comfort index $F_5$ cannot be increased to "3", and air-conditioning control under the "medium low air flow rate $V_{aML}$" continues for a long period of time.

Therefore, a passenger can be prevented from feeling cold when cold air in the passenger room is stirred due to an increase in outlet air flow rate $V_a$ regardless of the fact that the low passenger room temperature $T_r$ is low.

Figure 31:
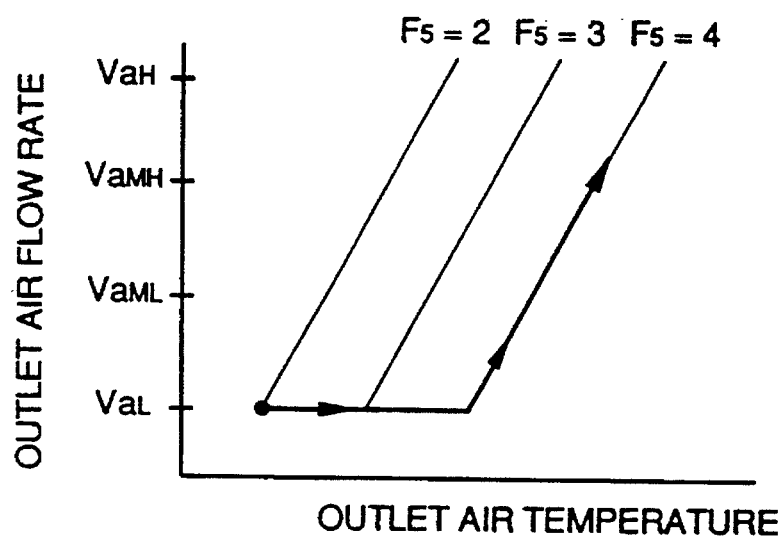
FIG. 31 is a graph showing a control content of warm-up control according to a first modification of the third embodiment.

FIG. 31 shows a modification of the third embodiment. The control content shown in FIG. 31 will be described below. A minimum air flow rate $v_{aL}$ is maintained until the comfort index $F_5$ becomes "4", and after the comfort index $F_5$ becomes "4", air-conditioning control is performed under a condition that the comfort index $F_5=4$.

According to this modification, after the engine cooling water temperature $T_w$ is sufficiently increased, and the passenger room temperature $T_r$ is increased to some extent, the outlet air flow rate is increased. For this reason, stirring of cold air in the passenger room can be minimized.

Figure 32:
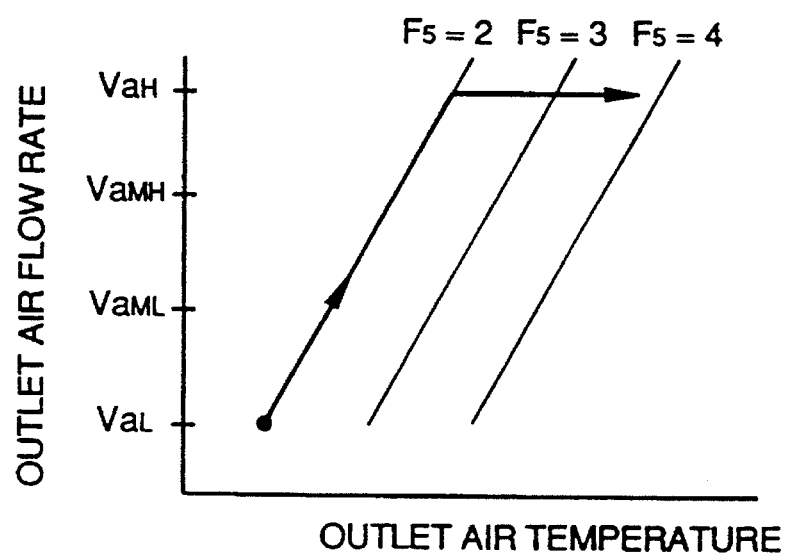
FIG. 32 is a graph showing a control content of warm-up control according to a second modification of the third embodiment.

FIG. 32 shows the second modification of the third embodiment. The control content shown in FIG. 32 will be described below. Air-conditioning control is performed in the defroster mode under a condition that the comfort index $F_5=2$, and when the outlet air flow rate becomes a maximum air flow rate $V_{aH}$, the outlet temperature is increased toward the comfort index $F_5=5$. Thus, as the value of the index $F_5$ is increased, the defroster/heating mode is selected when $F_5=3$, and the heating mode is selected when $F_5=4$. According to the second modification, the passenger room temperature $T_r$ can be increased quickly although the comfort of a passenger is sacrificed.

As can be apparent from the above description, according to the third embodiment, since an increase in outlet air flow rate is suppressed while the passenger room temperature is low, stirring of cold air in the passenger room due to an outlet operation of air-conditioning air can be suppressed, and a passenger can be prevented from feeling cold.

Not only control of the outlet mode depending on only the engine cooling water temperature but also control of the outlet mode in consideration of the comfort of a passenger can be realized.

The present invention is not limited to the above embodiments and various changes and modifications can be made within the spirit and scope of the present invention. Therefore, to apprise the public of the scope of the present invention the following claims are made.

What is claimed is:

1. A method of controlling a vehicle air conditioner, wherein a discomfort level felt by a passenger before a temperature of an evaporator is decreased at the beginning of a cooling operation, and a comfort level which will be felt by the passenger under an assumption that air-conditioning air is output after the temperature of said evaporator begins to fall at the beginning of the cooling operation are compared with each other, and when the comfort level represents a state more comfortable than that represented by the discomfort level, an outlet operation of air-conditioning air is started.

2. A vehicle air conditioner comprising:
   comfort index calculation means for calculating a comfort index including, as parameters, factors which influence comfort of a passenger in heating control during a warm-up operation;
   detection means for detecting information necessary for calculating the comfort index; and
   outlet mode control means for changing an outlet mode in the heating control during the warm-up operation in accordance with a value of the comfort index calculated by said comfort index calculation means.

3. The air conditioner according to claim 2, wherein the parameters of the comfort index include a passenger room temperature.

4. The air conditioner according to claim 3, wherein the parameters of the comfort index include an outlet air flow rate and an outlet air temperature of air-conditioning air.

5. A vehicle air conditioner for suppressing an outlet air flow rate in heating control during a warm-up operation, comprising:
   room temperature detection means for detecting a passenger room temperature at the beginning of the heating control during the warm-up operation; and
   air flow rate control means for receiving a signal from said room temperature detection means, and for, when the passenger room temperature at the beginning of the heating control is low, decreasing a rate of increase in outlet air flow rate as compared to a case wherein the passenger room temperature is high.

6. A vehicle air conditioner for suppressing an outlet air flow rate in heating control during a warm-up operation, comprising:
   calculation means for calculating a comfort index including, as a parameter, a passenger room temperature at the beginning of the heating control during the warm-up operation; and
   air flow rate control means for, when the passenger room temperature is low and the comfort index has a small value, decreasing a rate of increase in outlet air flow rate as compared to a case wherein the passenger room temperature is high and the comfort index has a large value, in accordance with the comfort index.

7. An apparatus for controlling a vehicle air conditioner, comprising:
   comfort index calculation means for calculating a comfort index having, as parameters, factors which influence comfort felt by a passenger at a beginning of an operation of the air conditioner;

detection means for detecting information which is necessary for calculating the comfort index;

air conditioning ability determining means for determining an air conditioning ability of the air conditioner on the basis of the comfort index; and control means for controlling an outlet air flow rate and an outlet air temperature of the air conditioner so as to reduce a discomfort felt by a passenger at the beginning of the operation of the air conditioner in accordance with the air conditioning ability determined by the air conditioning ability determining means.

8. The apparatus according to claim 7, wherein the beginning of the operation of the air conditioner is the beginning of a warming operation.

9. The apparatus according to claim 7, wherein the beginning of the operation of the air conditioner is the beginning of a cooling operation.

10. The apparatus according to claim 8, wherein the vehicle air conditioner executes a warming operation by using heat of the cooling water of an engine, and the air conditioning ability determining means determines a temperature of the cooling water at the beginning of the warming operation of the air conditioner on the basis of the comfort index.

11. The apparatus according to claim 9, wherein the air conditioning ability determining means determines a temperature of an evaporator at the beginning of the cooling operation of the air conditioner on the basis of the comfort index.

12. An apparatus for controlling a vehicle air conditioner comprising:

calculation means for calculating a discomfort level felt by a passenger before a temperature of an evaporator is decreased at the beginning of a cooling operation, and a comfort level which will be felt by the passenger under an assumption that air-conditioning air is output after the temperature of said evaporator begins to fall at the beginning of the cooling operation;

comparing means for comparing the discomfort level with the comfort level; and control means for controlling the air conditioner so that when the comfort level represents a state more comfortable than that represented by the discomfort level, an outlet operation of air-conditioning air is started.

13. A method of controlling a vehicle air conditioner comprising:

a detecting step of detecting information which is necessary for calculating a comfort index;

a comfort index calculation step of calculating the comfort index having, as parameters, factors which influence comfort felt by a passenger at the beginning of an operation of the air conditioner;

an air conditioning ability determining step of determining an air conditioner ability of the air conditioner on the basis of the comfort index; and a control step of controlling an outlet air flow rate and an outlet air temperature of the air conditioner so as to reduce a discomfort felt by a passenger at the beginning of the operation of the air conditioner in accordance with the air conditioning ability determined at the air conditioning ability determining step.

* * * * *

UNITED STATES PATENT AND TRADEMARK OFFICE
CERTIFICATE OF CORRECTION

PATENT NO. : 5,603,226
DATED : February 18, 1997
INVENTOR(S) : Toshikazu ISHIKAWA et al.

It is certified that error appears in the above-identified patent and that said Letters Patent is hereby corrected as shown below:

Col. 7,      line 4, change "2.for" to --2 for--;

line 40, should not be new paragraph.

Col. 9,      line 50, change "$Q_a = Cp \cdot \gamma V_a(T_o-T_r)$" to --$Q_a = Cp \cdot \gamma \cdot V_a(T_o-T_r)$--.

Col. 10,     line 8, change "$Cp \cdot \gamma V_a(T_o-T_{SET}) = K \cdot S(T_{SET}-T_a)-K_s \cdot T_s-C + K_i \cdot (T_{SET}-T_r)$" to --$Cp \cdot \gamma \cdot V_a(T_o-T_{SET}) = K \cdot S(T_{SET}-T_a)-K_s \cdot T_s-C + K_i \cdot (T_{SET}-T_r)$--;

line 13, change "$Cp \cdot \gamma V_a(T_o-T_{SET}) = K \cdot S(T_{SET}-T_a)-K_s \cdot T_s-C$" to --$Cp \cdot \gamma \cdot V_a(T_o-T_{SET}) = K \cdot S(T_{SET}-T_a)-K_s \cdot T_s-C$--;

line 20, change "$Cp \cdot \gamma V_a(T_o-T_{SET}) = K \cdot S(T_{SET}-T_a)-K_s \cdot T_s-C$" to --$Cp \cdot \gamma \cdot V_a(T_o-T_{SET}) = K \cdot S(T_{SET}-T_a)-K_s \cdot T_s-C$--;

line 26, change "$F = K_1 \cdot V_a + K_2 \cdot T_o + K_3 \cdot T_a + K_4 \cdot T_r + K_5 T_s$" to --$F = K_1 \cdot V_a + K_2 \cdot T_o + K_3 \cdot T_a + K_4 \cdot T_r + K_5 \cdot T_s$--.

UNITED STATES PATENT AND TRADEMARK OFFICE
CERTIFICATE OF CORRECTION

PATENT NO. : 5,603,226
DATED : February 18, 1997
INVENTOR(S) : Toshikazu ISHIKAWA et al.

It is certified that error appears in the above-identified patent and that said Letters Patent is hereby corrected as shown below:

Col. 11, line 66, change "AS" to --As--.

Col. 12, line 8, change "Va2" to --$V_{a2}$--;

line 18, change "$V_{a(n-l)}$." to --$V_{a(n-1)}$.-- lines 62-63, change "temperature. $T_r$" to --temperature $T_r$--.

Col. 13, line 4, change "that-his" to --that his--;

line 38, change "AT." to --$\Delta T$.--.

Col. 14, line 42, change "Val" to --$V_{a1}$--.

Col. 20, line 4, change "the." to --the--.

Col. 22, line 66, change " "4" " to --"4",--.

Col. 23, line 6, change " "6" " to --"6",--;

line 22, change " "4" " to --"4",--.

UNITED STATES PATENT AND TRADEMARK OFFICE
CERTIFICATE OF CORRECTION

PATENT NO. : 5,603,226
DATED : February 18, 1997
INVENTOR(S) : Toshikazu ISHIKAWA et al.

It is certified that error appears in the above-identified patent and that said Letters Patent is hereby corrected as shown below:

Col. 25, line 20, change " "$F_o = 5$" " to --"$F_o = 5$",--, line 23, change " "5" " to --"5",--.

Col. 29, line 13, change " "3" " to --"3",--;

line 52, change "$F_5$becomes" to --$F_5$ becomes--.

Col. 30, line 53, change " "0.5"along" to --"0.5" along--.

Col. 31, line 3, change " "4" " to --"4",--;

line 41, change "$V_{aL}$" to -- VaL--

Signed and Sealed this

Twenty-ninth Day of December, 1998

Attest:

BRUCE LEHMAN

Attesting Officer

Commissioner of Patents and Trademarks